United States Patent
Wang et al.

(10) Patent No.: US 9,335,605 B2
(45) Date of Patent: May 10, 2016

(54) ITERATION OF OPTICAL TIME REVERSAL BY ULTRASONIC ENCODING IN BIOLOGICAL TISSUE

(71) Applicant: The Washington University, St. Louis, MO (US)

(72) Inventors: Lihong Wang, St. Louis, MO (US); Xiao Xu, St. Louis, MO (US)

(73) Assignee: WASHINGTON UNIVERSITY, St. Louis, MO (US)

( * ) Notice: Subject to any disclaimer, the term of this patent is extended or adjusted under 35 U.S.C. 154(b) by 0 days.

(21) Appl. No.: 14/026,577

(22) Filed: Sep. 13, 2013

(65) Prior Publication Data
US 2014/0009808 A1    Jan. 9, 2014

Related U.S. Application Data

(63) Continuation-in-part of application No. 13/574,994, filed as application No. PCT/US2011/022253 on Jan. 24, 2011.

(60) Provisional application No. 61/298,086, filed on Jan. 25, 2010, provisional application No. 61/700,771, filed on Sep. 13, 2012.

(51) Int. Cl.
  *G01B 11/02* (2006.01)
  *G02F 1/33* (2006.01)
  (Continued)

(52) U.S. Cl.
  CPC ............ *G02F 1/33* (2013.01); *G03H 1/0005* (2013.01); *G03H 1/04* (2013.01); *G03H 1/0465* (2013.01); *G03H 1/12* (2013.01); *G03H 1/22* (2013.01); *G03H 2001/0083* (2013.01);
  (Continued)

(58) Field of Classification Search
  CPC ........................................................ G02F 1/33
  USPC ........................................................ 356/502
  See application file for complete search history.

(56) References Cited

U.S. PATENT DOCUMENTS

| | | | |
|---|---|---|---|
| 4,029,756 A | 6/1977 | Gaafar | |
| 4,284,324 A * | 8/1981 | Huignard et al. | 359/7 |

(Continued)

FOREIGN PATENT DOCUMENTS

| | | |
|---|---|---|
| JP | 2009-068977 A | 4/2009 |
| WO | 2008/062354 A1 | 5/2008 |
| WO | 2011/091360 A2 | 7/2011 |

OTHER PUBLICATIONS

Office Action from related U.S. Appl. No. 13/574,994, dated Mar. 17, 2014, 9 pgs.

(Continued)

*Primary Examiner* — Tarifur Chowdhury
*Assistant Examiner* — Omar Nixon
(74) *Attorney, Agent, or Firm* — Armstrong Teasdale LLP

(57) ABSTRACT

Iterating an optical phase conjugation of ultrasonically-modulated diffuse light emitted by a scattering medium includes illuminating the scattering medium with a light beam from a coherent light source, modulating the diffuse light transmitted through the scattering medium with an ultrasonic wave focused on a region of interest within the scattering medium, fixing a hologram, retro-reflectively illuminating the scattering medium using a phase-conjugated copy of the diffuse light that was ultrasonically modulated, moving the ultrasonic focus, and iterating until light is focused on the final target.

19 Claims, 13 Drawing Sheets

(51) Int. Cl.
*G03H 1/04* (2006.01)
*G03H 1/12* (2006.01)
*G03H 1/00* (2006.01)
*G03H 1/22* (2006.01)

(52) U.S. Cl.
CPC ... *G03H 2001/0434* (2013.01); *G03H 2210/63* (2013.01); *G03H 2260/36* (2013.01)

(56) References Cited

U.S. PATENT DOCUMENTS

| | | | |
|---|---|---|---|
| 4,546,771 A | | 10/1985 | Eggleton et al. |
| 4,921,333 A | | 5/1990 | Brody et al. |
| 5,329,817 A | * | 7/1994 | Garlick et al. .......... 73/605 |
| 5,546,187 A | | 8/1996 | Pepper et al. |
| 6,055,097 A | | 4/2000 | Lanni et al. |
| 6,590,830 B1 | * | 7/2003 | Garlick et al. .......... 367/8 |
| 2005/0168749 A1 | | 8/2005 | Ye et al. |
| 2006/0235299 A1 | | 10/2006 | Martinelli |
| 2007/0213590 A1 | | 9/2007 | Squicciarini |
| 2008/0037367 A1 | * | 2/2008 | Gross et al. .......... 367/8 |
| 2009/0116518 A1 | | 5/2009 | Patel et al. |
| 2011/0071402 A1 | | 3/2011 | Masumura |
| 2011/0122416 A1 | | 5/2011 | Yang et al. |
| 2012/0070817 A1 | | 3/2012 | Wang et al. |
| 2012/0307250 A1 | | 12/2012 | Wang |

OTHER PUBLICATIONS

Non-Final Office Action from related U.S. Appl. No. 13/143,832 dated Apr. 18, 2014, 14 pgs.

Notification of Transmittal of the International Search Report and the Written Opinion of the International Searching Authority, Sep. 22, 2011, from related application No. PCT/US2011/022253, 8 pgs.

Xu et al., "Time Reversal Ultrasound Modulated Optical Tomography Using a BSO Phase Conjugate Mirror," poster presented at SIPE Conference 7177 on Jan. 26, 2009 (3 pages).

* cited by examiner

ITERATION OF OPTICAL TIME REVERSAL BY ULTRASONIC ENCODING IN BIOLOGICAL TISSUE

CROSS REFERENCE TO RELATED APPLICATIONS

This application is a continuation-in-part of U.S. application Ser. No. 13/574,994 filed on Aug. 14, 2012 and entitled "OPTICAL TIME REVERSAL BY ULTRASONIC ENCODING IN BIOLOGICAL TISSUE", which is a National Stage Entry of PCT application PCT/US2011/022253 filed on Jan. 24, 2011, which claims the benefit of U.S. Provisional Application 61/298,086 filed Jan. 25, 2010, each of which is hereby incorporated by reference herein in their entirety. This application also claims the benefit of U.S. Provisional Application 61/700,771 filed Sep. 13, 2012 and entitled "ITERATION OF OPTICAL TIME REVERSAL BY ULTRASONIC ENCODING IN BIOLOGICAL TISSUE", which is also incorporated herein by reference in its entirety.

STATEMENT REGARDING FEDERALLY SPONSORED RESEARCH & DEVELOPMENT

This disclosure was made with government support under grants R01 CA094267, R01 CA106728, and DP1 EB016986 awarded by the U.S. National Institutes of Health. The government has certain rights in the disclosure.

FIELD OF THE INVENTION

Aspects of the present disclosure relate to systems and methods related to the iteration of time-reversed ultrasonically encoded optical focusing. In particular, aspects of the disclosure relates to devices and methods for photon tunneling for deep focusing of light within a scattering medium.

BACKGROUND

Light is the only electromagnetic wave known to be sensitive to molecular conformation, and as such is an essential tool for probing the structure and properties of matter and for monitoring physical, chemical or biological processes. Light, as opposed to potentially harmful X-rays, is an ideal non-ionizing radiation for imaging and treating biological tissues. Despite the advantages of light as a means of probing and monitoring structures and processes, the application of light imaging techniques such as optical imaging is limited within biological tissues and other heterogeneous media.

Optical imaging through a highly scattering medium, such as biological tissue, has been stymied by the loss of optical focusing due to the effects of optical scattering due to refractive index variations within the medium. Current optical imaging techniques, such as optical coherence tomography, are limited to a depth of approximately one optical transport mean free path, typically about 1 millimeter within biological tissues. Other well-known techniques, such as confocal microscopy and multi-photon microscopy, have even more restricted penetration paths. Other imaging techniques, such as diffuse optical tomography or thermal wave microscopy, have relatively low depth to resolution ratios.

Accordingly, focusing light into a scattering medium is much more valuable than focusing through the scattering medium. In fact, the former can be reduced to the latter by moving the ultrasound focus. Focusing through a scattering medium may be used to image a target outside a scattering medium, which can be either viewed directly from the target side or scanned by a collimated laser beam. Focusing light into the scattering medium must be used to image or treat a target embedded within a scattering medium. For example, when a tumor inside biological tissue is optically imaged or treated, light must be focused to the tumor.

High-resolution optical imaging relies on the ability to focus light precisely into a scattering medium at a desired depth. Photodynamic therapy and optogenetics also make use of light focused and/or delivered to specific regions of interest inside biological tissue. However, multiple scattering bodies such as cells, tissues, and organs within scattering media such as biological tissues impose a fundamental optical diffusion limit on direct light focusing in scattering media. Consequently, the imaging depth of current forms of focusing optical microscopy, such as confocal microscopy, may be limited to less than one transport mean free path. A number of technologies have been developed that attempt to address this limitation. For example, light can be focused through biological tissue by optical phase conjugation, or focused into a static scattering medium by iterative wavefront shaping, which maximizes the signal strength of a blurred yet visible implanted target in a scattering medium.

Time-reversed ultrasonically encoded (TRUE) optical focusing is a recently-developed technique that may be used to illuminate a scattering medium with a coherent light source. The TRUE optical focusing technique is described in detail in pending U.S. Non-Provisional application Ser. No. 13/574,994, which is hereby incorporated by reference in its entirety. In brief, diffused coherent light introduced into a scattering medium may be encoded by a focused ultrasonic wave acting as an internal "guide star" inside the scattering medium. Only the encoded light emerging from the guide star is time-reversed and transmitted back, thereby providing illumination to the guide star region within the scattering medium. At present, the TRUE optical focusing technique is limited to focusing light to the discrete guide star region, and the light must pass through the scattering medium. As a result, a significant portion of the coherent light introduced into the scattering medium may be lost to scattering within the intervening scattering medium situated between the guide star, the coherent light source output, and the encoded light collecting optics.

A need exists for an enhanced method of focusing light into a scattering medium, such as biological tissue, that is tolerant of dynamic microstructures. In particular, there is a need for an enhanced system and method of penetrating and focusing light beyond the optical transport mean free path within a scattering medium.

BRIEF SUMMARY

In one aspect, a method for focusing light within a scattering medium is provided. The method includes illuminating the scattering medium with a sample beam from a coherent light source. The scattering medium includes an ultrasound focus containing a focused ultrasound wave at a first position. The method also includes obtaining a first signal beam emerging from the scattering medium that contains a first ultrasound-modulated wavefront. This first ultrasound-modulated wavefront includes a portion of the sample beam which has passed through the ultrasound focus at the first position. The method further includes recording the first ultrasound-modulated wavefront from the first signal beam, advancing the ultrasound focus to a second position within the scattering medium, and illuminating the scattering medium with a first phase-conjugated wavefront corresponding to the first ultrasound-modulated wavefront.

The method in this aspect further includes obtaining a second signal beam emerging from the scattering medium that contains a second ultrasound-modulated wavefront. This second ultrasound-modulated wavefront includes a portion of the first phase-conjugated wavefront which has passed through the ultrasound focus at the second position. The method additionally includes recording the second ultrasound-modulated wavefront from the second signal beam.

In another aspect, an apparatus for focusing light within a scattering medium is provided that includes a coherent light source to emit a sample beam into the scattering medium and a movable ultrasound transducer to produce a focused ultrasound wave at one of at least two positions. The apparatus further includes a phase-conjugating device to record an ultrasound-modulated wavefront and to produce a phase-conjugated wavefront corresponding to the ultrasound-modulated wavefront. In addition, the apparatus includes a controller to operate the coherent light source, the movable ultrasound transducer, and the phase-conjugating device in a coordinated fashion.

In an additional aspect, a system for focusing light within a scattering medium is provided that includes a moveable ultrasound transducer, a coherent light source, an optical assembly, a phase-conjugating device, and a controller. The moveable ultrasound transducer is operatively connected to the scattering medium to produce at least one focused ultrasound wave within each of a sequence of focus regions situated within the scattering medium. The optical assembly is operatively connected to the coherent light source, the scattering medium, and the phase-conjugating device. The optical assembly receives one or more coherent light beams from the coherent light source, delivers a sample beam into the scattering medium, and delivers a reference beam and a reconstruction beam to the phase-conjugating device. The phase-conjugating device is operatively connected to the scattering medium. The phase-conjugating device receives an ultrasound-encoded portion of the sample beam from the scattering medium; holographically records the ultrasound-modulated wavefront as an interference pattern between the ultrasound-encoded portion of the sample beam and the reference beam; holographically reads the ultrasound-modulated wavefront using the reconstruction beam to produce a phase-conjugated beam; and delivers the phase-conjugated beam to the scattering medium. The controller is operatively connected to the light source, the optical assembly, the phase-conjugating device, and the ultrasound transducer. The controller controls at least one of: A) the movement of the ultrasound transducer between each of the sequence of focal regions; B) the production of each of the at least one focused ultrasound waves by the ultrasound transducer; C) the delivery of the sample beam, the reference beam, and the reconstruction beam by the optical assembly; and D) the production of the one or more coherent light beams by the coherent light source.

Other aspects of the disclosure are described in detail below.

BRIEF DESCRIPTION OF THE DRAWINGS

Corresponding reference characters and labels indicate corresponding elements among the views of the drawings. The headings used in the figures should not be interpreted to limit the scope of the claims.

DETAILED DESCRIPTION

Provided herein are photon tunneling systems and methods for focusing ultrasonically encoded light deep within a scattering medium in various aspects. These photon tunneling systems and methods may be used to implement a variety of imaging modalities in a scattering medium, including, but not limited to, fluorescence imaging, ultrasound-modulated optical tomography, diffuse optical tomography, and photoacoustic tomography. In addition, the photon tunneling systems and methods may be incorporated into many biological and clinical processes that use nonintrusive localized light delivery and manipulation of light inside the human and/or animal body, including, but not limited to, photodynamic therapy and optogenetics.

Phase-conjugation in the frequency domain, or time reversal in the time domain, transforms an electromagnetic wave by reversing the propagation direction and phase variation but maintaining the amplitude. A phase-conjugate mirror reflects a wave that is the phase-conjugate of the incoming wave. While a wave that strikes a regular mirror may be reflected at an angle of reflection that may be different from the angle of incidence, a wave that strikes a phase-conjugate mirror may be reflected in the opposite direction along the same angle of incidence.

Detailed descriptions of various aspects of the photon tunneling system and methods of photon tunneling using the system are provided herein below.

I. Photon Tunneling System

Figure 1:
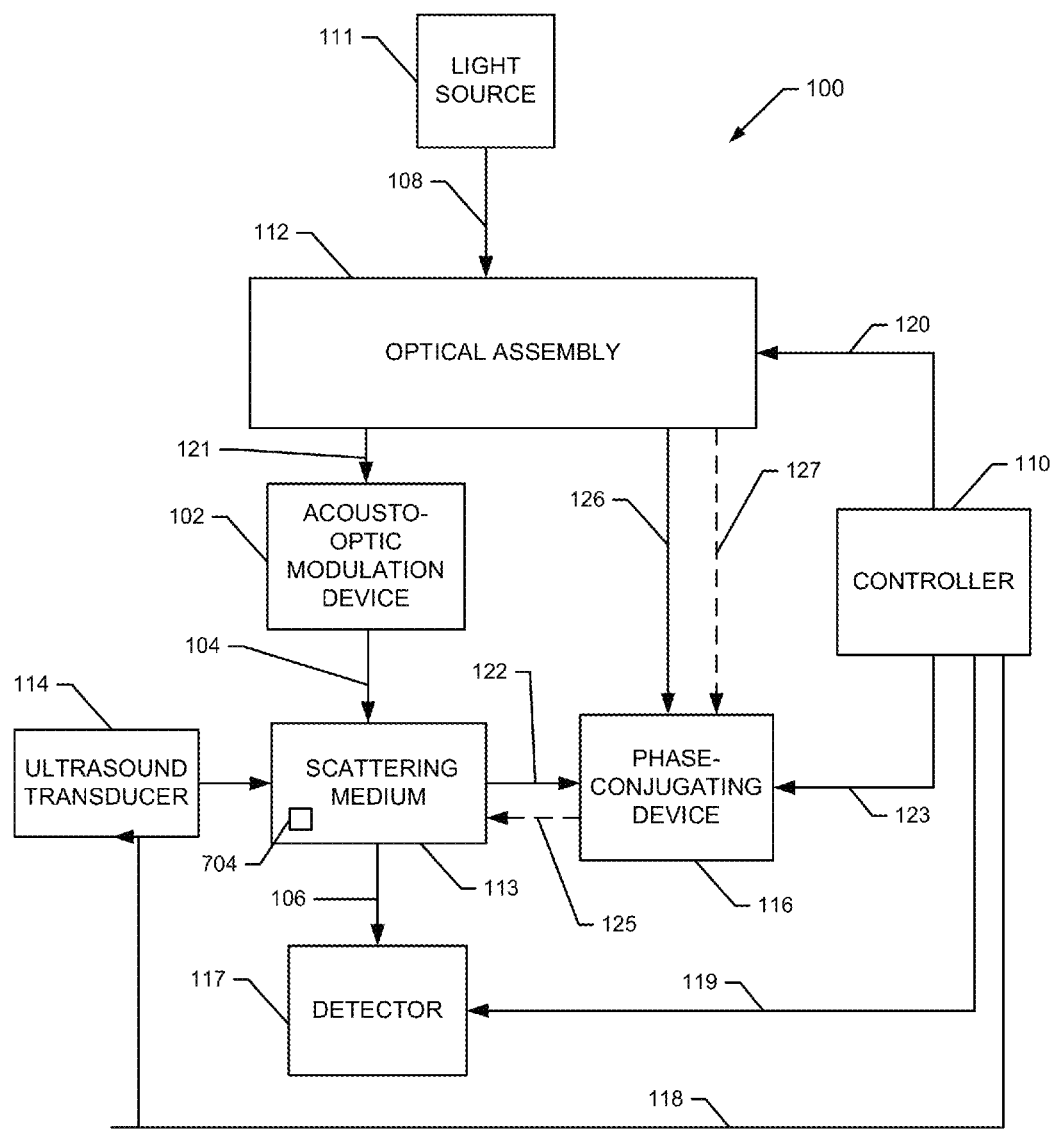
FIG. 1 is a schematic diagram of a photon tunneling imaging system.

FIG. 1 is a schematic diagram of a photon tunneling system 100 in an aspect. The photon tunneling system 100 may include, but is not limited to, a coherent light source 111, an optical assembly 112, at least one acousto-optic modulation (AOM) device 102, an ultrasound transducer 114, a phase-conjugating device 116, a controller 110, and a detector 117.

In this aspect, the coherent light source 111 may produce a coherent light beam 108 at an essentially constant wavelength that may be used to illuminate structures within a scattering medium 113. The coherent light beam 108 may be delivered to the optical assembly 112 to be split into multiple beams, including a sample beam 121, a reference beam 126, and a reconstruction beam 127. The sample beam 121 may pass through at least one acousto-optic modulation device 102, resulting in a modified sample beam 104 which may illuminate the scattering medium 113 and be modulated by the ultrasound focus 704 of the ultrasound transducer 114, which may be situated within the scattering medium 113. The portion of the modified sample beam 104 that is modulated by the ultrasound focus 704 may emerge from the scattering medium 113 as a signal beam 122. A hologram may be recorded, fixed, and read on the phase-conjugating device 116 by the interference of the signal beam 122 and the reference beam 126. The phase-conjugating device 116 may include an assembly of one or more devices capable of dynamic holography. Non-limiting examples of suitable devices include photorefractive crystals (PRC) or polymers (PRP), CCD or CMOS cameras, spatial light modulators (SLM), and any combination thereof.

The ultrasound transducer 114, optical assembly 112, phase-conjugating device 116, and detector 117 may be operated in a coordinated fashion using the controller 110. The controller 110 may produce optical-control signals 120 to control the timing of the delivery of the sample beam 121, the reference beam 126, and the reconstruction beam 127 by the optical assembly 112. The controller 110 may also produce ultrasound focus control signals 118 to direct the operation of the ultrasound transducer 114 and/or movement of the ultrasound focus 704. The controller 110 may further produce phase conjugating control signals 123 to operate the phase-conjugating device 116 and detector control signals 119 to operate the detector 117. The acousto-optic modulation device 102 may also be controlled using AOM control signals (not shown) produced by the controller 110.

The photon tunneling system 100 may further include an electronic system (not shown) which may include, but is not limited to, scanner drivers and controllers, amplifiers, digitizers, laser wavelength tuning systems, computers, processors, displays, storage devices, and any combination thereof. The photon tunneling system 100 may further include a scanning apparatus (not shown) to operate the photon tunneling system 100 in a scanning mode including, but not limited to a raster scanning mode. One or more components of the photon tunneling system 100 may be in communication remotely with one or more components of the electronic system, the scanning apparatus, or both.

In other aspects, the photon tunneling system 100 may include an additional one or more ultrasonic transducers (not shown). The additional one or more ultrasonic transducers may function in cooperation with the ultrasound transducer 114 to produce the ultrasound focus 704 in an aspect. In another aspect, the additional ultrasonic transducers may be arranged with the ultrasound transducer 114 in a spatial array to effectuate the production and movement of the ultrasound focus 704 within the scattering medium 113 in another aspect.

The photon tunneling system 100 may be used with any scattering medium 113 that light may penetrate without limitation. Non-limiting examples of suitable scattering media include: biological tissue including soft tissue and/or hard tissue; water; oil; colloids; mixtures; and any combination thereof. In an aspect, the photon tunneling system 100 may be used with a variety of medical and biological applications that make use of light without limitation. Non-limiting examples of suitable medical and biological applications include reporter gene imaging, oximetry, glucometry, optogenetics, nerve stimulation, photodynamic therapy, and photothermal therapy. In another aspect, the photon tunneling system 100 may be used with and/or integrated into an optical imaging system including, but not limited to, fluorescence tomography, optical tomography, and optical microscopy. In yet another aspect, the photon tunneling system 100 may be integrated into a transmission mode fluorescence imaging system. In yet other aspects, the photon tunneling system may be used in additional non-medical or non-biological applications requiring the penetration of light within scattering media such as turbid aqueous solutions.

Aspects of the photon tunneling system 100 include any optical imaging device that uses a focused ultrasonic wave to modulate a temporally coherent light wave inside a highly scattering medium 113, subsequently generates a time-reversed wavefront of the ultrasound-modulated light to illuminate the same scattering medium 113, and iteratively advances a discrete ultrasonic focus until a target is reached. Non-limiting examples of devices compatible with the systems and methods for photon tunneling in various aspects include optical imaging systems and fluorescence microscopes.

A detailed description of the components of the photon tunneling system 100, including the coherent light source 111, the optical assembly 112, the acousto-optic modulation device 102, the ultrasound transducer 114, the phase-conjugating device 116, the detector, 117, and the controller 110 are provided herein below.

a. Coherent Light Source

Referring back to FIG. 1, the photon tunneling system 100 may include a coherent light source 111. The coherent light source 111 may generate a coherent light beam 108, which may be split, modulated, encoded, and/or otherwise modified as it passes through the photon tunneling system 100. The coherent light source 111 interacts with the optical assembly 112 to provide the light beams used by the photon tunneling system 100 to implement the photon tunneling method, including the sample beam 121, the reference beam 126, and the reconstruction beam 127.

In an aspect, the coherent light source 111 may provide a coherent light beam 108 (i.e. light having an essentially constant wavelength) at a frequency, $f_o$, to illuminate structures within the scattering medium 113. Any known source of coherent light may be used as the coherent light source 111 without limitation. In an aspect, the coherent light source 111 may be a tunable laser. In other aspects, the laser may be a continuous wave laser or a pulsed laser.

The coherent light beam 108 may be provided by the coherent light source 111 at any wavelength in the electromagnetic spectrum including, but not limited to, radio waves, microwaves, near-infrared, or visible light. The wavelength of the coherent light beam 108 may typically be provided at a wavelength ranging from visible light to near-infrared light, in various aspects. In various other aspects, the coherent light beam 108 may have a wavelength ranging from about 200 nm to about 2500 nm, corresponding to a frequency $f_o$ ranging from about $1.2 \times 10^8$ MHz to about $1.5 \times 10^9$ MHz. In another aspect, the coherent light beam 108 may have a wavelength ranging from about 400 nm to about 1300 nm. In other aspects, the wavelength of the coherent light beam 108 may range from about 200 nm to about 400 nm, from about 300 nm to about 600 nm, from about 500 nm to about 800 nm, from about 600 nm to about 1000 nm, from about 800 nm to about 1200 nm, and from about 1000 nm to about 1500 nm. In one aspect, the wavelength of the coherent light beam 108 may be about 532 nm.

The coherence length ($L_C$) of the coherent light beam 108 may influence the tunnel width of the photon tunneling system 100. In an aspect, the coherent light beam 108 may have a long coherence length or about the same order of magnitude relative to the range of transmission path lengths of the various light beams within the photon tunneling system 100. In another aspect, the coherent light beam 108 may have a relatively short coherence length in which the coherence length is much shorter than the range of the transmission path lengths of the various light beams within the photon tunneling system 100. The magnitude of the coherence length of the coherent light beam 108 relative to the range of the transmission path lengths of the various light beams within the photon tunneling system 100 may influence the tunnel width achieved by the photon tunneling applications. In an aspect, a short coherence length may be used to select a small group of path lengths, especially those of the relatively straight paths, via the coherence gating mechanism.

Without being limited to any particular theory, the shorter the coherence length, the smaller the tunnel widths are that may be achieved by the photon tunneling system 100. The coherence length of the coherent light beam 108 is influenced by the properties of the coherent light beam 108 according to Eqn. (I):

$$L_C \propto 1/\Delta f \qquad \text{Eqn. (I)}$$

where $\Delta f$ is the frequency bandwidth of the coherent light beam 108.

In an aspect, the coherence length of the coherent light beam 108 may range from about 1 mm to about 100 m. The coherence length of the coherent light beam 108 may be selected independently of the selection of the ultrasound frequency.

The energy fluence of the coherent light beam 108 may be selected to provide sufficient illumination for the photon tunneling system 100. In addition, the fluence of the coherent light beam 108 may not exceed the thresholds at which significant cell photodamage may occur. The selection of energy fluence of the coherent light beam 108 may be further influenced by the wavelength of the coherent light beam 108; light at longer wavelengths, such as NIR wavelengths, is known to penetrate biological tissues more effectively compared to light at other wavelengths. In an aspect, the coherent light beam 108 may have an energy fluence ranging from about 0.1 mJ/cm$^2$ to about 10 J/cm$^2$. In one aspect, the fluence may range from about 30 mJ/cm$^2$ to about 100 mJ/cm$^2$ for a coherent light beam 108 produced in the NIR spectral region by the coherent light source 111.

In an aspect, the coherent light beam 108 may be split by the optical assembly 112 into a sample beam 121 which may be modified and illuminate the scattering medium 113, a reference beam 126 which records a hologram with the signal beam 122 on the phase-conjugating device 116, and a reconstruction beam 127 which reads the hologram and retro-reflectively illuminates the scattering medium 113 with a phase-conjugated beam 125.

The signal beam 122 is the scattered light that emerges from the scattering medium 113 after illumination by the modified sample beam 104. The signal beam may include a portion of unmodulated light and a remaining portion of ultrasound-modulated light. The unmodulated light consists of light scattered through the scattering medium 113 without being modulated by the ultrasound focus 704. The ultrasound-modulated light consists of light scattered through the scattering medium 113 which is modulated by the ultrasound focus 704, resulting in the ultrasound modulation. In an aspect, the signal beam 122 emerging from the scattering medium 113 may consist essentially of ultrasound-modulated light.

The signal beam 122 may emerge from or be collected from any surface or region of the scattering medium 113 without limitation. Non-limiting examples of suitable surfaces or regions include a surface opposite the illumination surface, the illumination surface, a region at any position within the scattering medium 113, a region at any position on or near the scattering medium 113, and any combination thereof. In one aspect, only ultrasound-modulated, or encoded, light is time-reversed back to the ultrasound focus 704.

The hologram recorded on the phase-conjugating device 116 may consist essentially of the interference pattern between the ultrasound-modulated light component corresponding to the first harmonic of the signal beam 122 and the reference beam 126. As a result, the dimensions of the optical focus may be influenced predominantly by the dimensions of the ultrasound focus 704 and may be relatively unaffected by the multiple scattering of light. Without being limited to any particular theory, the harmonics of the interference patterns correspond to the interaction between the reference beam 126, which has a frequency $f_o$, and the components of the signal beam 122, which may include at least several frequencies resulting from the ultrasonic modulation of light within the scattering medium 113. The first harmonic of the signal beam 122, as described below, has a frequency $f_o$ that is matched with the frequency of the reference beam 126. This matching of frequencies results in a stable interference pattern that is amenable to being recorded as a hologram by the phase-conjugating device 116.

The frequency of the sample beam 121 may be shifted by at least one acousto-optic modulation device 102 before entering the scattering medium 113. The sample beam 121 initially has a frequency $f_o$ matching the coherent light beam 108. The sample beam 121 is introduced into the acousto-optic modulation device 102 and shifted by a frequency $f_a$ that is equivalent to the acoustic frequency of the ultrasound transducer 114. The resulting modified sample beam 104 has a frequency $f$ as expressed in Eqn. (II):

$$f_s = f_o - f_a \qquad \text{Eqn. (II)}$$

Modulated light emerging from the scattering medium 113 contains a series of harmonics within the signal beam 122 resulting from the phase modulation of the multiply scattered light by the ultrasound. These harmonics are frequency-shifted from the frequency of the modified sample beam 104 by multiples of the ultrasonic frequency 0, $\pm f_a$, $\pm 2f_a$, etc. The first harmonic of the signal beam 122 may be expressed as in Eqn. (III):

$$\text{First harmonic } f = f_s + f_a = f_o - f_a + f_a = f_o \qquad \text{Eqn. (III)}$$

The second harmonic of the signal beam 122 corresponds to the frequency $f_s$ of the modified sample beam 104 that was not modulated by the ultrasound focus 704. The third harmonic of the signal beam 122 may be expressed as in Eqn. (IV):

$$\text{Third harmonic } f = f_s - f_a = f_o - f_a - f_a = f_o - 2f_a \qquad \text{Eqn. (IV)}$$

The first harmonic of the signal beam 122, which has a frequency $f_o$, may then interfere with the reference beam 126, which has a matching frequency $f_o$, and record a stable hologram on the phase-conjugating device 116, as described herein previously. The interference patterns of the other harmonics will oscillate at $f_a$, $2f_a$, or higher frequencies, and will therefore record a smoothed background as their holograms within the response time of the phase-conjugating device 116.

b. Optical Assembly

The photon tunneling system 100 may further include an optical assembly 112 to receive a coherent light beam 108 from the coherent light source 111 and provide light to the scattering medium 113 and the phase-conjugating device 116. The optical assembly 112 may split the coherent light beam 108 into multiple light beams, control the direction of the light beams, turn the light beams on or off, and perform any other function necessary to direct the light within the photon tunneling system 100 in various aspects. In an aspect, the optical assembly 112 may be controlled by a controller 110.

The optical assembly 112 may include any suitable known optical components without limitation to deliver light in free space or in optical fibers; to regulate the light beam shapes, polarizations, and intensities; to detect light intensities; and to direct light beams to the phase-conjugating device 116. Non-limiting examples of suitable optical components for the optical assembly 112 include: mirrors, lenses, wave plates, beam splitters, Pockels cells, optical fiber bundles, light guides, polarizers, filters, isolators, shutters, photodiodes, photomultipliers, and any combination thereof. The optical assembly 112 may further include a light guide 115 for directing the signal beam 122 to the phase-conjugating device 116 and to direct the phase-conjugated beam 125 to the scattering medium 113.

Figure 2:
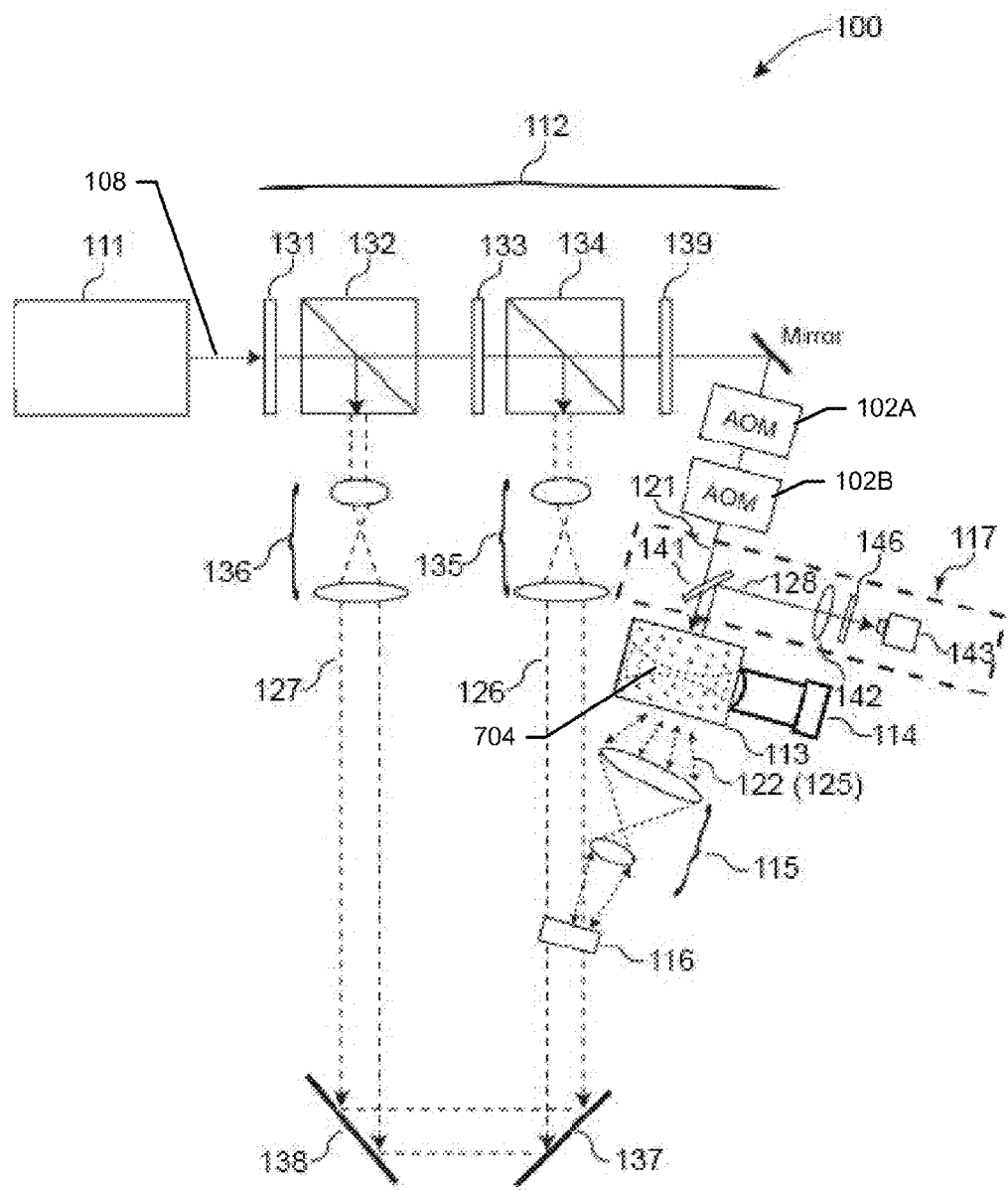
FIG. 2 is a diagram of an aspect of a photon tunneling imaging system.

FIG. 2 is a diagram of a photon tunneling system 100 with optical time reversed excitation by ultrasonic encoding in one aspect. In this aspect, the optical assembly 112 includes polarizing beam splitters 132 and 134, first and second Pockels cells 131 and 133, first and second collimating optics 135 and 136, a half wave plate 139, and two acousto-optic modulation devices 102A and 102B.

As illustrated in FIG. 2, a coherent light beam 108 may originate from a coherent light source 111 and may travel through the optical assembly 112. In the optical assembly 112, the coherent light beam 108 may be split into a sample beam 121, a reference beam 126, and a reconstruction beam 127. In an aspect, the coherent light beam 108 may be split into at least two beams or directed through at least two optical fibers. In one aspect, the coherent light beam 108 may be split into three light beams or directed into three optical fibers. In another aspect, the original coherent light beam 108 may be split by the first and second polarizing beam splitters 132 and 134 into first and second mutually conjugated light beams, including a reference beam 126 and a reconstruction beam 127, as shown in FIG. 2. Only one of the mutually conjugated reference light beams, the reference beam 126 or the reconstruction beam 127, may be active at any single time in this aspect. The on-off states and the relative intensities of the light beams 121, 126, and 127 may be controlled by first and second Pockels cells 131 and 133, each positioned in front of a corresponding beam splitter 132 and 134, respectively. In an aspect, the on-off states, blocked-unblocked states, and/or intensities of the light beams 121, 126, and 127 may be controlled by the controller 110 (not shown).

The reference beam 126 and the reconstruction beam 127 may be expanded and collimated by first and second collimating optics 135 and 136, respectively, each of which may be positioned after respective beam splitters 132 and 134, as illustrated in FIG. 2. First and second steering mirrors 137 and 138 may be positioned after the collimating optics 135 and 136, respectively, and may be adjusted such that the reference beam 126 and the reconstruction beam 127 may travel in opposite directions along a common beam path to produce a mutually conjugated beam pair. The sample beam 121 may be transmitted through a half wave plate 139 to align the polarization of the sample beam 121 with the polarization of the reference beam 126 and then through two acousto-optic modulators 141 and 142 in series, such that the optical frequency, $f_o$, of the sample beam 121 is shifted by the frequency difference of the driving frequencies of the two acousto-optic modulators 141 and 142 before illuminating a scattering medium 113. This frequency difference may be equivalent to the acoustic frequency $f_a$ of the ultrasound transducer 114, in an aspect.

The interference pattern between the reference light beam 126 and the signal beam 122 emerging from the scattering medium 113 may be holographically recorded by the phase-conjugating device 316. The signal beam 122 may be directed to the phase-conjugating device 116 by a light guide 115. After the hologram is recorded by the phase-conjugating device 116, the two Pockels cells 131 and 133 may be tuned by the controller 110 to block off the sample beam 121 and the reference beam 126 and to allow the reconstruction beam 127 to pass through and read out the stored hologram in one aspect. The reading of the hologram generates the phase-conjugated beam 125. The phase-conjugated beam 125 may be directed into the scattering medium 113 by the light guide 115.

c. Acousto-Optic Modulation Device

Referring back to FIG. 1, the photon tunneling system 100 may additionally include at least one acousto-optic modulation (AOM) device 102. The sample beam 121 may pass through at least one AOM device 102, resulting in a modified sample beam 104, before illuminating the scattering medium 113. The AOM device 102 may adjust the frequency of the sample beam 121 to compensate for the frequency of the ultrasound transducer 114 $f_a$, as previously described in Eqn. (II) above.

In an aspect, two AOM devices 102A and 102B may be used in tandem, as illustrated in FIG. 2. When two AOM devices 102 are used in tandem, the frequency difference between the AOM devices 102A and 102B may be used to adjust the sample beam 121 frequency. The AOM devices 102A and 102B may be driven independently by clocks of frequencies which are adjusted such that the frequency difference is approximately equal to the frequency $f_a$ produced by the ultrasound transducer 114.

In another aspect (not shown), the AOMs may be situated to modulate the reference beam 126 and reconstruction beam 127 instead of the sample beam 121. In this aspect, the reference beam 126 and reconstruction beam 127 may each pass through one or two AOMs 102 while the sample beam does not pass through any AOM 102. In this aspect, the reference beam 126 and reconstruction beam 127 may be frequency shifted to match the frequency of the first harmonic of the signal beam 122. Referring back to Eqn. (II), if the frequency of the sample beam 121 is not frequency-shifted by one or two AOMs, the frequency of the modified sample beam 104 used to illuminate the scattering medium 113 is $f_o$, and the first harmonic frequency of the signal beam 122 is $f_o+f_a$. Accordingly, the frequency of the first harmonic of the signal beam 122, the reference beam 126, and the reconstruction beam 127 are matched at $f_o+f_a$. In other aspects, the AOMs 102 may shift the frequency of the sample beam 121, the reference beam 126, and the reconstruction beam 127 to any degree and in any combination, so long as the frequency of the reference beam 126 and the reconstruction beam 127 are matched to either the first or third harmonic of the signal beam 122.

Figure 3:
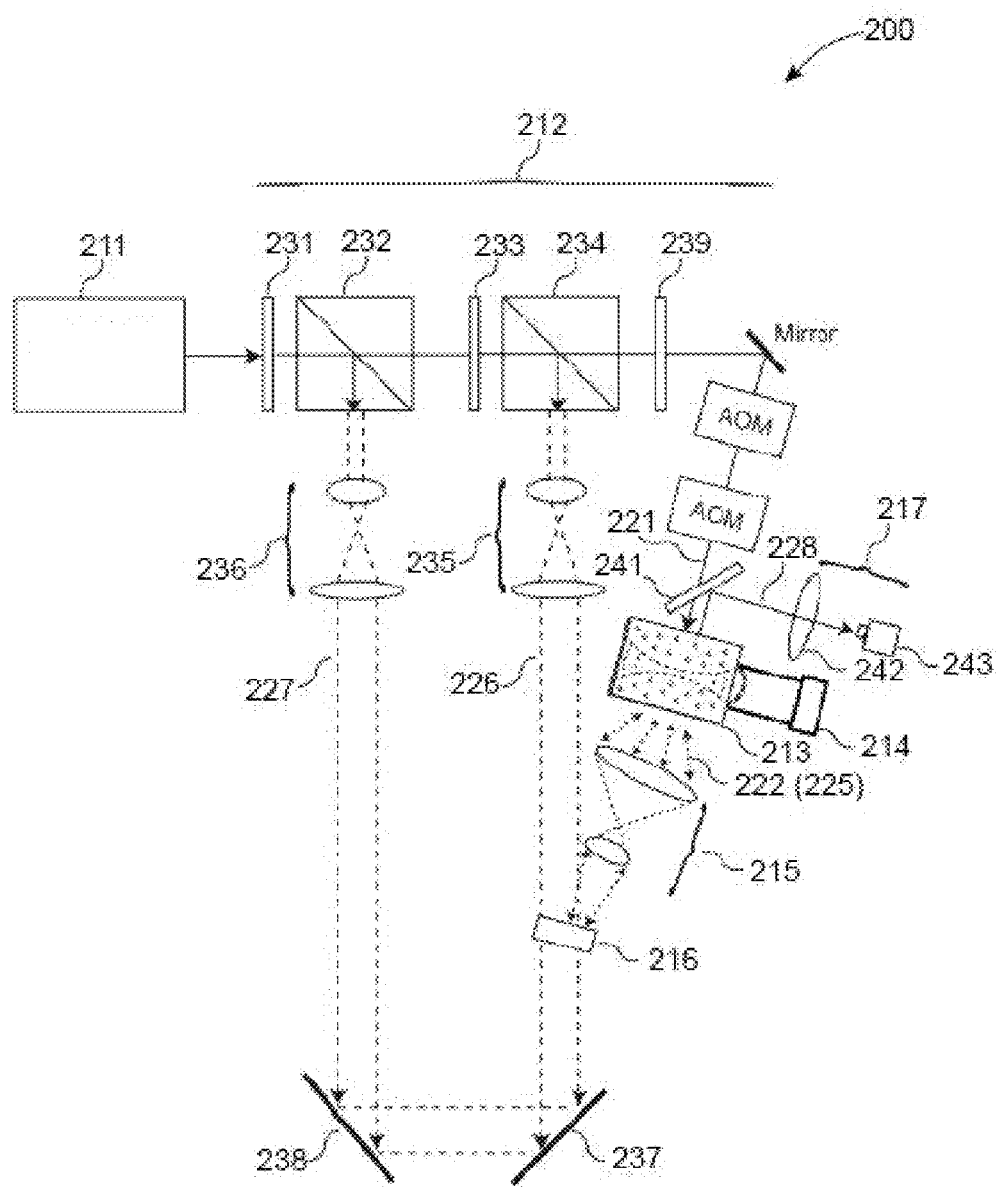
FIG. 3 is a diagram of an alternative aspect of a photon tunneling system based on optical time reversal by ultrasonic encoding.

By shifting the frequency of the modified sample beam 104 within the ultrasound focus 704, the ultrasound-modulated light may be easily differentiated from the non-modulated light within the signal beam 122 for the purposes of holographic recording and reading. As illustrated in FIG. 1 and FIG. 3, the hologram is recorded using the reference beam 126 and read using the reconstruction beam 127 which both have the same frequency, $f_o$, but are phase-conjugates of each other. The first harmonic of the modulated light will be recorded through the interference of the signal beam 122 and the reference beam 126 on the phase-conjugating device 116.

d. Ultrasound Transducer

Referring back to FIG. 1, the photon tunneling system 100 may include an ultrasound transducer 114. The ultrasound transducer 114 may generate a focused ultrasound wave with a frequency $f_a$ to produce an ultrasound focus 704 within the scattering medium 113. The ultrasound focus 704 may be considered as a virtual source of the ultrasonically modulated light. The position of the ultrasound focus 704 produced by the ultrasound transducer 114 may be situated at any position relative to the surface of the scattering medium 113 without limitation including, but not limited to at the surface of the scattering medium 113. The ultrasound transducer 114 may be connected to a controller 110 to effectuate the positioning and step-wise movement of the ultrasound focus 704. The controller 110 may command the size, shape and/or position of the ultrasound focus 704, the step size of each movement, the iteration speed of each step and/or any other suitable parameter for controlling the position and movement of the ultrasound focus 704.

The ultrasound transducer 114 may be any one or more focused ultrasound transducers without limitation. In an aspect, the ultrasound transducer 114 may be a single-element focused ultrasound transducer capable of producing an ultrasonic wave localized at an ultrasound focus 704 within a targeted region of the scattering medium 113. In another aspect, the ultrasound transducer 114 may be an array of focused ultrasound transducers. In an additional aspect, the ultrasound transducer 114 may be capable of scanning or moving the ultrasound focus 704 in a stepwise manner through the scattering medium 113. In this additional aspect, the ultrasound transducer 114 may be mounted on a moveable platform including but not limited to a multi-axis moveable stage; the movements of the moveable platform may be controlled by the controller 110.

The frequency ($f_a$) and wavelength ($\lambda_{US}$) of the ultrasound wave may be selected based on the ultimate desired depth of the target within the scattering medium 113 in an aspect. The selection of the ultrasound frequency $f_a$ may be constrained by the intensity, or amplitude, that the scattering medium 113 may be able to absorb without sustaining damage. For example, the ultrasound frequency and wavelength used with biological tissue may be chosen to limit damage to the tissue. The selection of an ultrasound frequency may be influenced by several other factors, including, but not limited to, the depth of the desired ultrasound focus 704, the loss the scattering medium is able to sustain, and a loss constant. Without being limited to a particular theory, in soft tissue where a 50 dB loss can be sustained, the relationship between the ultrasound frequency and the depth of focus within the scattering medium 113 may be described by Eqn. (V):

$$d < \frac{50 \text{ dB}}{\alpha_o f_a} \qquad \text{Eqn. (V)}$$

where $\alpha_o$ is a loss constant and d is the depth of the ultrasound focus 704 in the scattering medium 113. In soft tissue, $\alpha_o$ is about 0.5 dB/cm MHz.

For example, to focus an ultrasound wave at a depth of 1 cm, an ultrasound frequency of 100 MHz and an ultrasound wavelength of 15 µm may be used for a soft tissue according to Eqn. (V). In another example, to focus at a depth of 10 cm, an ultrasound wave with a frequency of 10 MHz and a wavelength of 150 µm may be used for the soft tissue according to Eqn. (V).

In other aspects, the ultrasound frequency may range from about 100 kHz to about 200 MHz. In yet other aspects, the ultrasound frequency may range from about 100 kHz to about 1 MHz, from about 0.5 MHz to about 10 MHz, from about 5 MHz to about 50 MHz, from about 25 MHz to about 100 MHz, and from about 50 MHz to about 200 MHz.

Without being limited to any particular theory, the ultrasound frequency $f_a$ and wavelength $\lambda_{us}$ are related by Eqn. (VI):

$$\lambda_{US} = \frac{c}{f_a} \qquad \text{Eqn. (VI)}$$

where c is the velocity of sound in the scattering medium 113.

Sound velocity c in biological tissue may be about 1.5 mm/µs. In an aspect, the ultrasound wavelength may range from about 0.75 µm to about 15 mm. In other aspects, the ultrasound wavelength may be from about 0.75 µm to about 10 µm, from about 5 µm to about 100 µm, from about 50 µm to about 200 µm, from about 100 µm to about 400 µm, from about 200 µm to about 600 µm, from about 400 µm to about 800 µm, from about 600 µm to about 1 mm, from about 800 µm to about 1.5 mm, and from about 1 mm to about 15 mm.

Without being limited to any particular theory, the diameter of the ultrasound focus 704, which influences the resolution of the photon tunneling system 100, may depend on the ultrasound wavelength and a ratio of the ultrasound transducer 114 aperture radius and the transducer's focal length, as described in Eqn. (VII), which assumes one-way transmission of the ultrasound wave:

$$\phi_{US} \approx \frac{\lambda_{US}}{\frac{D_{US}\sqrt{2}/2}{FL_{US}}} \qquad \text{Eqn. (VII)}$$

where $\varnothing_{US}$ is the diameter of the ultrasound focus 704, $D_{US}$ is the diameter of the ultrasound transducer 114 aperture and $FL_{US}$ is the focal length of the ultrasound transducer 114. It is to be noted that the relationship expressed in Eqn. (VII) may vary depending on one or more of at least several factors including, but not limited to whether one-way transmission or two-way reflection of the ultrasound wave is to be utilized.

As described in Eqn. (VII), the diameter $\varnothing_{US}$ of the ultrasound focus 704 increases proportionally with the ultrasound wavelength $\lambda_{us}$, and in inverse proportion to the aperture: focal length ratio of the ultrasound transducer 114. In an aspect, the ratio of the aperture and the focal length may range from about 0.1 to about 0.5. In another aspect, this ratio may be about 0.3. If the aperture:focal length ratio is about 0.3, then the diameter of the ultrasound focus 704 may be about $3\lambda_{US}$, according to Eqn. (VII). In an additional aspect, the diameter of the ultrasound focus 704 may range from about $1\lambda_{US}$ to about $10\lambda_{US}$.

Without being limited to any particular theory, the diameter of the ultrasound focus 704 may also be constrained according to Eqn. (VIII):

$$\phi_{US} > \lambda_{opt} \quad \text{Eqn. (VIII)}$$

where $\lambda_{opt}$ is the optical wavelength of the coherent light beam 108.

In an aspect, the ultrasound focus 704 diameter may range from about 0.75 μm to about 15 mm. In other aspects, the ultrasound focus 704 diameter may range from about 0.75 μm to about 10 μm, from about 5 μm to about 100 μm, from about 50 μm to about 200 μm, from about 100 μm to about 300 μm, from about 200 μm to about 400 μm, from about 300 μm to about 500 μm, from about 400 μm to about 600 μm, from about 500 μm to about 700 μm, from about 600 μm to about 800 μm, from about 700 μm to about 1 mm, from about 900 μm to about 1.5 mm, and from about 1 mm to about 15 mm.

Without being limited to any particular theory, the safety limit of the intensity of the ultrasound may be defined by a mechanical index (MI), as described in Eqn. (IX):

$$MI = \frac{P_{max}}{\sqrt{f_a}} \quad \text{Eqn. (IX)}$$

where $P_{max}$ is the maximum negative pressure of the ultrasound wave and $f_a$ is the ultrasound frequency. In an aspect, the MI may be less than about 1.9 in biological tissue.

Without being limited to any particular theory, a stronger $P_{max}$ may enhance the effectiveness of ultrasound modulation of the light. In an aspect, the $P_{max}$ may range from about 0.3 bar to about 268 bar. In other aspects, the $P_{max}$ may range from about 0.3 bar to about 2 bar, from about 1 bar to about 5 bar, from about 3 bar to about 10 bar, from about 5 bar to about 15 bar, from about 10 bar to about 20 bar, from about 15 bar to about 50 bar, from about 30 bar to about 80 bar, from about 50 bar to about 100 bar, from about 80 bar to about 150 bar, from about 100 bar to about 200 bar, and from about 150 bar to about 268 bar.

Referring back to FIG. 2, the signal beam 122 emerging from the scattering medium 113 may be modulated inside the scattering medium 113 by the focused ultrasound wave emanating from an ultrasound transducer 114 that is driven at the ultrasound frequency $f_a$. In the spectral domain, the signal beam 122 may be composed of a series of harmonics of the ultrasonic frequency, $S(f_o, f_o - f_a, f_o - 2f_a)$, as described herein previously. In this aspect, the first harmonic may have the same frequency $f_o$ as the reference beam 126 and reconstruction beam 127, and a strength proportional to the modulation depth. This first harmonic frequency is characteristic of the ultrasound-light interaction inside the scattering medium 113 with the focused ultrasound wave emanating from the ultrasound transducer 114.

In various aspects, the ultrasound focus 704 may be iteratively advanced deeper into the scattering medium 113 upon the successive iteration of the phase-conjugated beam 125 back into the scattering medium 113. The iteration step size of the ultrasound focus 704 may be selected to be less than one transport mean free path in the scattering medium 113, as discussed herein below. The time between each iteration step may be selected to be less than about the speckle decorrelation time, which is associated with the movement of microstructures within the scattering medium 113, as discussed herein below.

In an aspect, the movement of the ultrasound focus 704 may be associated with an iterative process. The phase-conjugated beam 125 produced from the signal beam 122 modulated by the ultrasound when its ultrasound focus 704 is at a first location may be used as the sample beam 121 or modified sample beam 104 to be modulated by the ultrasound from the ultrasound transducer 114 when its ultrasound focus 704 is at a second location. The ultrasound beam from the ultrasound transducer 114 may be focused geometrically with lenses, focused using a spherically curved transducer, focused electronically using a phased array, any other method of ultrasound focusing known in the art, and any combination thereof.

e. Phase-Conjugating Device

Referring back to FIG. 1, the photon tunneling system 100 may include a phase-conjugating device 116 to record the ultrasound-encoded portion of the signal beam 122 and to generate a phase-conjugated beam 125 corresponding to the signal beam 122. In various aspects, optical phase conjugation (also referred to herein as time reversal) may be implemented by: (1) holographically recording an interference pattern on the phase-conjugating device 116 between the modified sample beam 104 that is scattered within the scattering medium 113 and collected as a signal beam 122, and a reference beam 126 that is derived from the same coherent light source 111 that produced the sample beam 121; and (2) reading the recorded hologram from the phase-conjugating device 116 using a reconstruction beam 127 that is the phase-conjugate of the reference beam 126, thereby producing a phase-conjugated beam 125 corresponding to the signal beam 122. In this aspect, the reference beam 126 and its phase-conjugate reconstruction beam 127 are derived from the same coherent light source 111 that illuminates the scattering medium 113 to produce the signal beam 122.

Once the wavefront corresponding essentially to the frequency-shifted light within the signal beam 122 is recorded and played back to produce the phase-conjugated beam 125, this phase-conjugated beam 125 may retrace the trajectory or trajectories taken by the signal beam 122 toward the ultrasound focus 704. Referring back to FIG. 2, collimating optics 115 including, but not limited to, a pair of lenses may collect the signal beam 122 into the phase-conjugating device 116, where a dynamic hologram of the interference pattern between the signal beam 122 and the reference beam 126 may be recorded. A bandpass filter may also be used to reject the non-frequency-shifted light and efficiently collect the frequency-shifted light only to form the hologram.

A stable interference pattern that is typically recorded within the phase-conjugating device 116 may occur as a result of the interaction between the first harmonic component of the signal beam 122, as described herein previously in Eqn. (III), and the reference beam 126. The recording period, which may depend on the characteristics of the phase-conjugating device 116 and on the intensity of the two recording beams 122 and 126, may be selected to be faster than the speckle decorrelation time associated with the internal motion of the scattering medium 113. To support the iterative process of reading and recording holograms in photon tunneling, the hologram may be fixed after each recording, as disclosed herein below. This may allow the phase-conjugating device 116 to have an energy gain greater than unity, thereby producing a phase-conjugated beam 125 that has higher intensity than the corresponding signal beam 122.

In this aspect, the phase-conjugating device 116 records the amplitude-phase distribution of the portion of the signal beam 122 emanating from the virtual source or the ultrasound focus 704 in the scattering medium 113 by obtaining an interference pattern of the signal beam 122 and the reference beam 126 in the form of a hologram. This recorded hologram may be read from the phase-conjugating device 116 using a reconstruction beam 127 that is the phase-conjugate of the reference beam 126, thereby generating a phase-conjugated beam 125 of the signal beam 122 that may be returned to the scattering medium 113.

Any known phase-conjugating device 116 may be selected for use in the photon tunneling system 100 without limitation. Non-limiting examples of suitable phase-conjugating devices 116 include: photorefractive crystals (PRCs), a combination of holographic recording devices such as CCD or CMOS cameras, a computer to control the CCD or CMOS cameras and to resolve the recorded holograms, spatial light modulators (SLMs), or any other known phase-conjugate mirrors or photoreactive devices.

The phase-conjugating device 116 may be selected based on any one or more of at least several criteria including, but not limited to: the spatial resolution of the device, the sensitivity of the device to light within a desired range of frequency and intensity, the ability to record and/or store one or more holograms over a desired time period, and the ability to produce phase-conjugates of the signal beam 122 with a desired intensity. For example, a PRC may produce a high degree of spatial resolution, but may be limited to recording a single hologram and may produce a phase-conjugated beam 125 with an intensity that is less than or equal to the intensity of the signal beam 122 used to record the hologram. In another example, a spatial light modulator with a CCD or CMOS camera may produce a phase-conjugated beam 125 corresponding to the signal beam 122 at any desired intensity, but may have limited resolution.

In an aspect, the phase-conjugating device 116 may include a photorefractive (PR) material. Non-limiting examples of suitable PR materials include: photorefractive crystals (PRC) such as $Bi_{12}SiO_{20}$ (BSO), lithium niobate, gallium arsenide, and other photorefractive polymers or photorefractive materials known in the art, and any combination thereof. In an aspect, the photorefractive crystal may be selected to be compatible for use at the wavelength of the coherent light source 111. In another aspect, the PRC may be capable of multiple read/write cycles within a specified period of time to support the iterative method of photon tunneling. For example, a PRC may be selected to perform a read/write cycle within a time period that is less than the time of each successive movement of the ultrasound focus 704 through the scattering medium 113. In one aspect, the resolution for a PRC may be about 4000×3300 pixels on a 5×5 $mm^2$ crystal.

In an aspect, the phase-conjugating device 116 may include a CCD or CMOS camera to record the interference pattern between the signal beam 122 and the reference beam 126. In this aspect, the phase-conjugated beam 125 corresponding to the ultrasonically-modulated portion of the signal beam 122 may be digitally reconstructed from the interference pattern captured by the CCD or CMOS camera using a spatial light modulator illuminated by the reconstruction beam 127. In this aspect, the CCD or CMOS camera may be connected to a computer, which resolves the phase-amplitude distribution of the first harmonic component of the signal beam 122 from the recorded hologram, and transfers the phase-conjugated wavefront onto the spatial light modulator. In one aspect, the pixel resolution of the spatial light modulator may be about 1920×1080 pixels.

Referring back to FIG. 2, the means for reading the hologram recorded on the phase-conjugating device 116 is illustrated schematically for one aspect of the photon tunneling system 100. After the hologram is recorded and fixed on the phase-conjugating device 116, the first Pockels cell 131 in front of the first polarizing beam splitter 132 may be tuned such that the sample beam 121 and the reference beam 126 are blocked off and such that the reconstruction beam 127 is allowed to pass to the phase-conjugating device 116. The reconstruction beam 127 may illuminate the phase-conjugating device 116, generating from its diffraction off the recorded hologram the phase-conjugated beam 125. The phase-conjugated beam 125 may retrace the propagation paths of the signal beam 122 to retro-reflectively illuminate the scattering medium 113 and converge to the ultrasound focus 704 within the scattering medium 113 where the first harmonic component of the signal beam 122 originated. In this aspect, the phase-conjugating device 116 may be continually read and/or record throughout the iterative process of advancing the ultrasound focus 704 to create a photon tunnel.

f. Detector

Referring back to FIG. 1, the photon tunneling system 100 may include a detector 117 for detecting a signal 106 emitted from the scattering medium 113. The signal 106 detected by the detector 117 may include, but is not limited to, optical light originating from the coherent light source 111, fluorescent light excited by the light of the modified sample beam 104, or any other signal from the scattering medium 113. In one aspect, the detector 117 may be a photodetector. The detector 117 may be connected to or interact with an optical imaging system. In another aspect, the detector 117 may be connected to a controller 110 and operated automatically.

Referring back to FIG. 2, in an aspect, a signal 128, such as fluorescent light, may be excited within the ultrasound focus 704 and may emerge from the scattering medium 113. The signal 128 may be detected from the front side of the scattering medium 113 as illustrated in FIG. 2, or the signal 128 may be detected from any other side of the scattering medium 113, or from any combination of sides of the scattering medium 113 without limitation in various other aspects. The signal 128 may be detected by a detector 117 that includes a dichroic beam splitter 141 followed by a focusing lens 142 and an optical filter 146 positioned in front of a photodetector 143 as illustrated in FIG. 2. This signal 128 may then be encoded and/or transferred to a computer for data analysis to recover a fluorescence image of the scattering medium 113 through any known method including, but not limited to raster or three-dimensional (3D) scanning.

g. Controller

Referring back to FIG. 1, the photon tunneling system 100 may further include a controller 110. The controller 110 may interact and/or communicate with elements of the photon tunneling system 100 to direct their properties, actions, calculations, or any other operational aspect of the element. Elements of the photon tunneling system the controller 110 may control include, but are not limited to, the ultrasound transducer 114, the optical assembly 112, the phase-conjugating device 116, and the detector 117.

In an aspect, the controller 110 may be connected to the ultrasound transducer 114 to direct the step size and speed of movement of each iterative step of the ultrasound focus 704.

In another aspect, the controller 110 may be connected to the optical assembly 112 to direct the on-off state of the sample beam 121, the reference beam 126, and/or the reconstruction beam 127, the direction of these beams, the fluence of these beams, the frequency of these beams, and/or any other operational aspect of the optical assembly 112. In yet another aspect, the controller 110 may be connected to the phase-conjugating device 116 to control the reading, recording, and fixing of the hologram and/or any other operational aspect of the phase-conjugating device 116. In another additional aspect, the controller 110 may be connected to the detector 117 and control the detection of an optical signal from the scattering medium 113 and/or any other operational aspect of the detector 117.

In another aspect, the controller 110 may be provided in the form of a photon tunneling application executing on a computing device (not shown). The photon tunneling application may include instructions or modules that are executable by a processing system to enable a user to perform the photon tunneling methods described herein. In an aspect, the computing device may include the processing system that may include one or more processors or other processing devices. This processing system may execute a photon tunneling application to perform the photon tunneling methods described herein using stored data and/or data entered locally at the computing device.

According to another aspect, the computing device may include a computer readable medium ("CRM") configured with the photon tunneling application. The CRM may include volatile media, nonvolatile media, removable media, non-removable media, and/or another available medium that can be accessed by the computing device. By way of example and not limitation, computer readable medium comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

It will be understood by those of skill in the art that information and signals may be represented using any of a variety of different technologies and techniques. For example, data, instructions, commands, information, signals, bits, symbols, and/or chips may be represented by voltages, currents, electromagnetic waves, magnetic fields or particles, optical fields or particles, or any combination thereof. Similarly, the various illustrative logical blocks, modules, circuits, and algorithm operations described herein may be implemented as electronic hardware, computer software, or a combination of both, depending on the application and the functionality. Moreover, the various logical blocks, modules, and circuits described herein may be implemented or performed with a general purpose computer, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Exemplary general purpose processors include, but are not limited to only including, microprocessors, conventional processors, controllers, microcontrollers, state machines, or a combination of computing devices.

II. Photon Tunneling Method

In an aspect, the systems described herein above may be used to implement a method for photon tunneling, or time-reversed ultrasonically encoded (TRUE) optical focusing in an iterative manner. In this photon tunneling method, the ultrasound focus used to modulate the scattered light of the sample beam may be advanced iteratively to focus light into a scattering medium for use with optical imaging or therapies.

Time-reversed ultrasonically encoded (TRUE) optical focusing may be invoked iteratively to create a "photon tunnel" originating from a scattering medium surface towards a target. This TRUE optical focusing method is described herein below, as well as in related U.S. application Ser. No. 13/574,994, which is hereby incorporated by reference in its entirety. To "drill" the photon tunnel, a virtual guide star corresponding to the ultrasound focus may be iteratively translated within a scattering medium, and TRUE optical focusing may be performed at each successive location of the virtual guide star.

The photon tunneling method described herein overcomes many of the limitations of previous methods of illuminating structures within a scattering medium. Unprecedented light penetration depth, limited by only absorption instead of scattering, may be achieved using various aspects of the photon tunneling method. Because the optical absorption coefficient may be as low as 0.1/cm, or about 3 orders of magnitude less than the scattering coefficient, the penetration depth achievable by the photon tunneling method may be as deep as about 10 cm in various aspects.

The photon tunnels produced by the methods described herein may be formed in any shape without limitation. In various aspects, the photon tunnels may be straight, curved to bypass vital or opaque regions, or funnel-shaped to condense light. At each iterative step, the photon tunnel dimensions are defined predominantly by the corresponding dimensions of the ultrasound focus; the photon tunnel dimensions are essentially unaffected by multiple scattering of light. Advancing the ultrasound focus/virtual guide star along a predefined path creates the photon tunnel, which may encapsulate a multitude of optical scattering paths. Therefore, the light illumination volume is actively confined by the boundaries of the photon tunnel in the photon tunneling method. Because the photon tunnel length may be orders of magnitude shorter than the diffuse path lengths, photons propagating through the scattering medium via the tunnel experience reduced absorption compared to the diffusion/adsorption losses typically experienced through diffusion in a scattering medium, thereby enhancing the photon's delivery efficiency and depth of penetration.

The photon tunneling method may have a variety of applications including, but not limited to, imaging technologies (such as fluorescence tomography, fluorescence microscopy, reporter gene imaging, diffuse optical tomography, and photoacoustic tomography), sensing technologies (oximetry and glucometry), manipulation technologies (optogenetics and nerve stimulation), and therapeutic technologies (photodynamic therapy and photothermal therapy).

a. TRUE Optical Focusing

Time-reversed ultrasonically encoded (TRUE) optical focusing may be used to deliver light into any dynamically defined location inside a scattering medium. Using TRUE optical focusing, the scattering medium may be illuminated with a coherent light source, and the diffused coherent light may be encoded by a focused ultrasonic wave inside the scattering medium acting as a virtual guide star. Only the encoded light is time-reversed and transmitted back to the ultrasound focus within the scattering medium as a phase-conjugate of the encoded light. This phase-conjugated light may converge back to the ultrasound focus, which may function as a virtual aperture for the phase-conjugated light. The time-reversed ultrasonically encoded optical focus—defined by the ultrasonic wave—is unaffected by multiple scattering of light. Such focusing is particularly desirable in biological tissue, where ultrasonic scattering is approximately 1,000 times weaker than optical scattering.

Figures 7A, 7B:
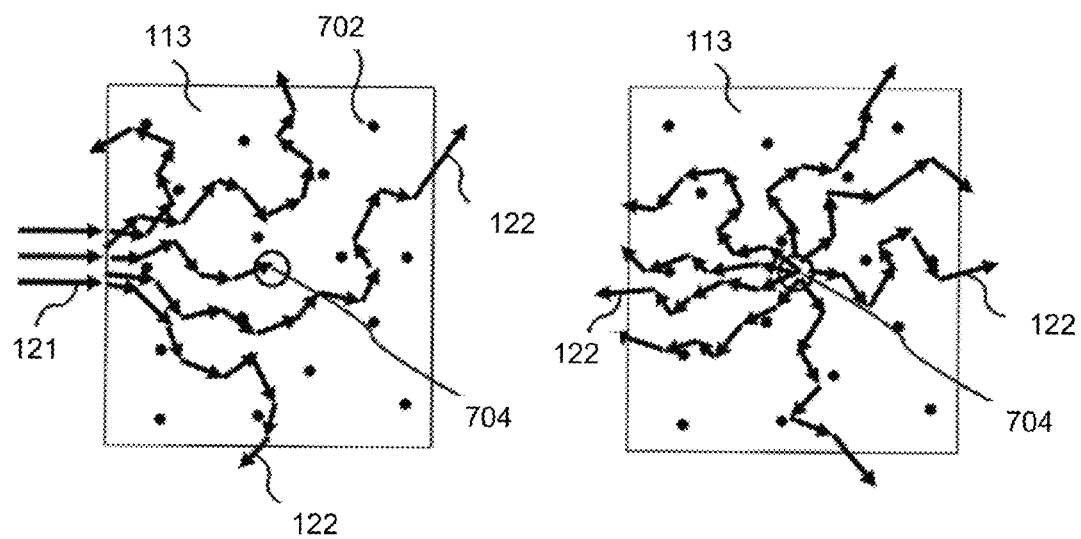
FIG. 7A is a schematic illustration of a sample beam entering a scattering medium.
FIG. 7B is a schematic illustration of the generation and propagation of the modulated (frequency-shifted) portion of the signal beam within the scattering medium.

FIG. 7 is a simplified illustration of a modified sample beam 104 entering a scattering medium 113, ultrasonic encoding of the sample beam 121 within the ultrasound focus 704, and the introduction of the phase-conjugated beam 125 back into the scattering medium 113. FIG. 7A illustrates the scattering of multiple photons from the sample beam 121 in the scattering medium 113. Once the sample beam 121 enters the scattering medium 113 that may include a plurality of scattering particles 702, the sample beam 121 may undergo multiple scattering throughout its propagation in the scattering medium 113 and may eventually exit from the surface of the scattering medium 113 as a signal beam 122.

A portion of the modified sample beam 104 may reach the ultrasound focus 704. Within the region of the ultrasound focus 704, the frequency of the modified sample beam 104 may be modulated by a predetermined amount related to the frequency of the ultrasound wave. Without being limited to any particular theory, when the scattering medium 113 is subjected to an ultrasonic wave, the refractive index of the scattering medium 113 may be modulated by the ultrasonic wave. In addition, the displacement of the scattering particles 702 in the scattering medium 113 may be induced at the frequency of the applied ultrasonic wave. When a portion of the modified sample beam 104 passes through the ultrasound focus 704, the optical phase of the light may be modulated by the frequency of the ultrasonic wave, resulting in the frequency-shift of the light, as described previously herein, and as specified in Eqn. (III) and Eqn. (IV).

In an aspect, an ultrasonic wave can be employed to modulate the frequency of the modified sample beam 104 at the ultrasound focus 704 as illustrated in FIG. 7. In other aspects, any other means of modulating the frequency of the modified sample beam 104 at a local position within the scattering medium 113 may be used.

FIG. 7B illustrates the generation and propagation of the modulated (frequency-shifted) portion of the signal beam 122A in the scattering medium 113. The modulated light portion of the signal beam 122A emerges from the ultrasound focus 704 with a frequency that is different from the frequency of the non-modulated light in the signal beam 122. This frequency-shifted portion of the signal beam 122A, like the non-modulated portion of the signal beam 122, propagates through the scattering medium 113 while undergoing multiple scattering and eventually exits from the scattering medium 113.

Figure 7C:
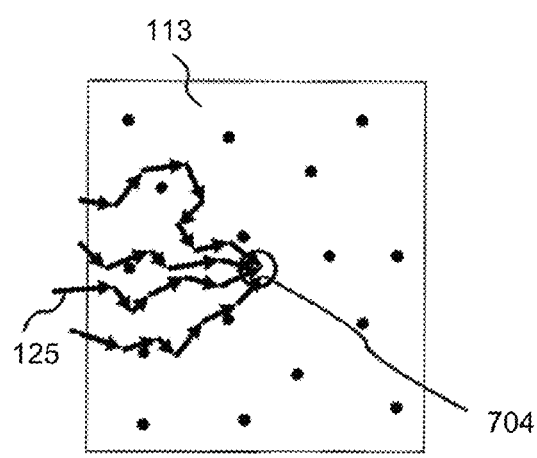
FIG. 7C is a schematic illustration of a phase-conjugated beam re-entering the scattering medium.

Without being limited to any particular theory, the ultrasound focus 704 may effectively act as a virtual light source inside the scattering medium 113 to produce frequency-shifted light of a frequency that is different from the frequency of the modified sample beam 104. This frequency-shifted portion of the signal beam 122A clearly originates from the ultrasound focus 704. Once the wavefront corresponding essentially to this frequency-shifted light in the signal beam 122A is recorded and is played back as its phase conjugation, this phase-conjugated beam 125 may retrace the trajectory of the frequency-shifted portion of the signal beam 122A, eventually reaching the ultrasound focus 704 as shown in FIG. 7C.

Referring back to FIG. 2, to implement TRUE optical focusing, light from a coherent light source 111 with a relatively long coherence length may be split into three parts: a sample beam 121 and two mutually conjugated beams: a reference beam 126 and a reconstruction beam 127. The sample beam 121 may be transmitted through two acousto-optic modulation devices 102 arranged in series to tune its optical frequency to $f_s$, as defined in Eqn. (II) before propagating diffusively through the scattering medium 113. A focused ultrasonic wave of the frequency $f_a$ may traverse the scattering medium 113 and modulate the modified sample beam 104. The ultrasonically modulated light may be regarded as emanating from a virtual source that is defined by the ultrasound focus 704 and is frequency-shifted by $\pm f_a$, resulting in two sidebands or harmonics with frequencies $f_+ = f_o$ (first harmonic as defined by Eqn. (III)) and $f_- = f_o - 2f_a$ (third harmonic as defined by Eqn. (IV)). This virtual source serves as the internal "guide star".

Outside the scattering medium 113, the signal beam 122 may be holographically recorded onto a phase-conjugating device 116, including, but not limited to a photorefractive crystal or a combination of holographic recording devices such as CCD or CMOS cameras, a computer to control the CCD or CMOS cameras and to resolve the recorded holograms, and a spatial light modulator (SLM). The only stationary hologram that may be recorded is from the interference between the reference beam 126 and the first harmonic of the signal beam 122, as discussed herein previously. The hologram may then be read by a reconstruction beam 127 to generate a time-reversed copy of the signal beam 122, or a phase-conjugated beam 125. Without being limited to any particular theory, because the wavefront of the phase-conjugated beam 125 essentially duplicates the distribution of amplitude of the signal beam 122 and reverses its phase variation and propagation direction, optical reversibility predicts that the phase-conjugated beam 125 will back-trace the trajectory of the signal beam 122 and converge to the ultrasound focus 704, thereby achieving optical focusing into the scattering medium 113.

b. Iterative TRUE

In various aspects, a photon tunnel may be created iteratively by translating the ultrasound focus 704 step-wise within the scattering medium 113 and performing TRUE optical focusing at each step-wise location of the ultrasound focus 704 until a final target is reached. This method of photon tunneling may include, but is not limited to, illuminating a scattering medium 113 with a coherent light beam 108 from a coherent light source 111, focusing an ultrasonic wave at the ultrasound focus 704 near the surface of the scattering medium 113, modulating the scattered light resulting in a signal beam 122 from the scattering medium 113, recording a hologram on a phase-conjugating device 116, fixing the hologram, reading the hologram to generate a phase-conjugated copy of the signal beam and retro-reflectively illuminating the scattering medium 113, advancing the ultrasound focus 704 one step deeper into the scattering medium 113, and repeating the recording, fixing, and reading steps until light is focused on the final target in the scattering medium 113.

Figure 6:
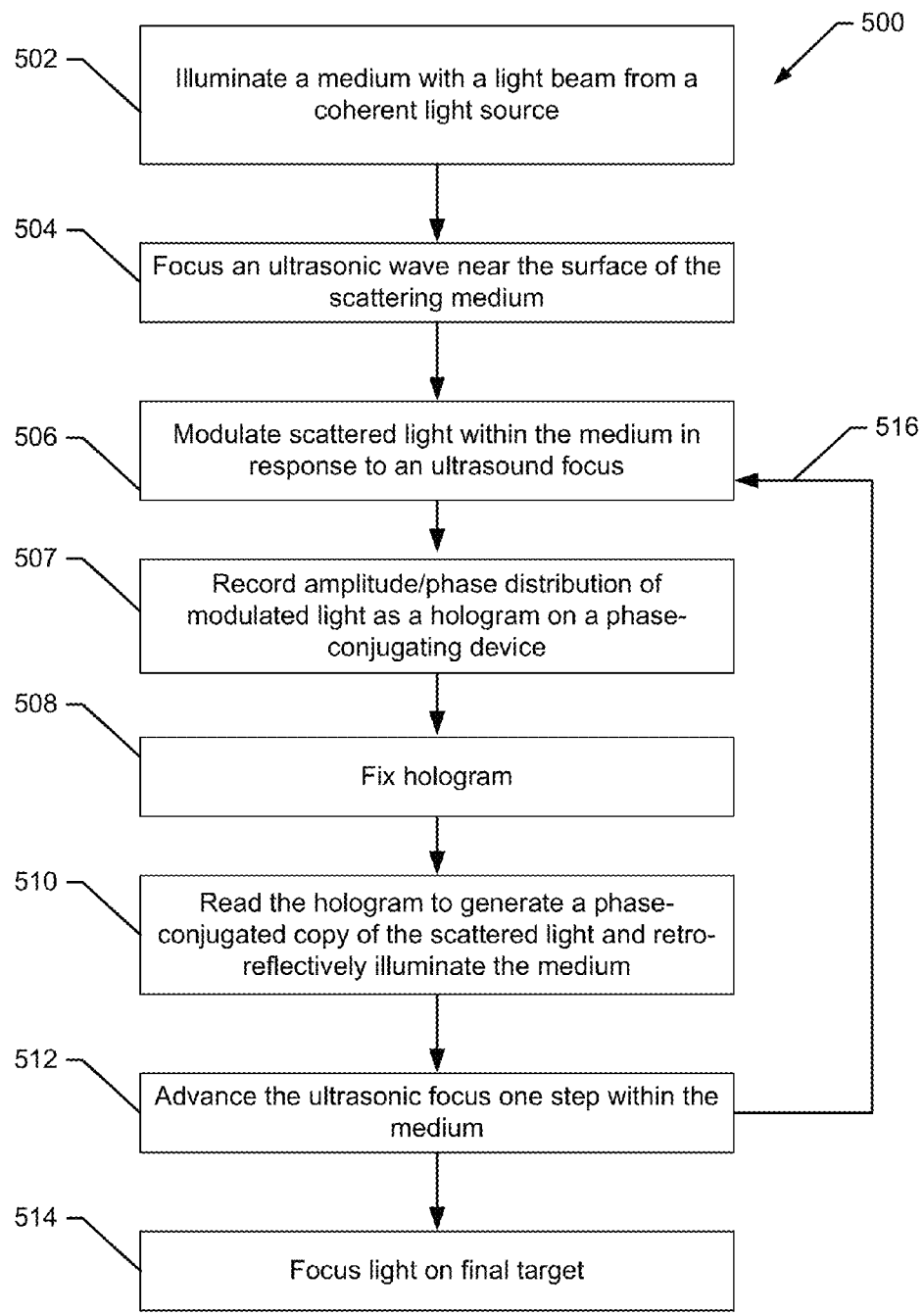
FIG. 6 is a flowchart illustrating an exemplary method of photon tunneling.

FIG. 6 illustrates a method 500 for iterating an optical phase conjugation of diffuse light emitted by a highly scattering medium 113 (shown in FIG. 1) in an aspect. Any one or more of the operations described in FIG. 6 may be implemented using a controller, computer, and/or processor. Moreover, the method 500 shown in FIG. 6 may serve as an example of an algorithm to be executed by a computer or processor for iterating an optical phase conjugation of diffuse light emitted by a highly scattering medium 113.

In this method 500, the scattering medium may be illuminated using a coherent light beam that is emitted by a coherent light source 111 at step 502. An ultrasonic wave emitted by a focused ultrasound transducer may be focused near the surface of the scattering medium to create a first ultrasound focus at step 504. In one aspect, this first ultrasound focus may be situated near the surface of the scattering medium at a distance of no more than one transport mean free path of light in the scattering medium. The size and shape of the region within the ultrasound focus may be flexibly scaled with the ultrasonic frequency as described herein above and in Eqn. (VII).

Referring back to FIG. 6, the diffuse or scattered light within the scattering medium may be modulated at step 506, where the ultrasound focus acts as a virtual source of the modulated light. Collecting optics may collect the diffuse light, a portion of which includes the modulated light, into a phase-conjugating device. The amplitude/phase distribution of the modulated light may be recorded on a phase-conjugating device at step 507. This amplitude/phase distribution may be recorded in the form of a hologram as illustrated in FIG. 6, or in any other known form as described herein previously. A dynamic hologram of an interference pattern between the modulated light and a reference beam may be holographically recorded by the phase-conjugating device at step 507.

The dynamic hologram may be fixed on the phase-conjugating device at step 508. In an aspect, the hologram on a photorefractive crystal may be thermally or electrically fixed. In another aspect, the hologram may be digitally recorded by a CCD or CMOS camera, and the wavefront of ultrasound-modulated light may be resolved and used to control a spatial light modulator. Hologram fixing may enhance the energy gain of the phase-conjugating device to be greater than unity, which may be desirable for the purpose of iteration, as described herein below. The energy gain of the phase-conjugating device may be further enhanced through the use of faster photorefractive materials, time-reversal techniques with energy gains greater than unity, and more efficient time-reversal configurations.

The hologram may be read to generate a phase-conjugated copy of the modulated portion of the scattered light to retro-reflectively illuminate the scattering medium at step 510. For example, referring back to FIG. 2, the first Pockels cell 131 may be tuned to block off the sample beam 121 and the reference beam 126, and allow the reconstruction beam 127 to pass through. The reconstruction beam 127 may illuminate the phase-conjugating device 116 such that the phase-conjugating device 116 generates from its diffraction off the hologram a phase-conjugated beam 125 that is the phase-conjugate of the first harmonic of the signal beam 122. The phase-conjugated beam 125 may retrace the propagation paths of the signal beam 122 to retro-reflectively illuminate the scattering medium 113 and to converge the phase-conjugated beam 125 to the ultrasound focus 704 within the scattering medium 113.

In an aspect, the ultrasound focus may be advanced one step within the scattering medium at step 512. The step size may be selected to be no more than about one transport mean free path of the light in the scattering medium. The time between each step may be selected to be within the speckle decorrelation time. Steps 506-512 may then be repeated iteratively at step 516, moving the ultrasound focus along a pre-determined path defining the photon tunnel until the desired target and depth within the scattering medium are reached at step 514.

i. Illumination of a Scattering Medium

In an aspect, the method of photon tunneling may include illuminating a scattering medium with a coherent light beam from a coherent light source. In one aspect, the coherent light source may be a long coherence length CW laser operating at a selected wavelength suitable for imaging biological tissue. In another aspect, the coherent light source may be a short coherence length CW or pulsed laser. The coherent light beam may have a wavelength anywhere within the electromagnetic spectrum, as described previously herein.

Referring back to FIG. 2, the coherent light beam 108 from the coherent light source 111 may be split into at least two beams including, but not limited to, a reference beam 126, and/or a reconstruction beam 127. For example, the coherent light beam 108 may be split by polarizing beam splitters 132 and 134 into a sample beam 121 and two mutually conjugated light beams: a reference beam 126 and a reconstruction beam 127. The reference beam 126 and the reconstruction beam 127 may be expanded and collimated by the collimating optics 135 and 136, respectively. Moreover, the sample beam 121 may be transmitted through a half wave plate 139 to align the polarization of the sample beam 121 with the polarization of the reference beam 126. The sample beam 121 may be also transmitted through two acousto-optic modulators (AOMs) 141 and 142 to shift the optical frequency of the sample beam 121 by a frequency $f_a$ matched to the acoustic frequency of the ultrasound wave produced by the ultrasound transducer 114. The shifted sample beam 121 then may illuminate the scattering medium 113.

The reference beam 126 and the reconstruction beam 127 may be used to record and/or read a hologram on a phase-conjugating device 116, respectively. A phase-conjugated beam 125 generated from the reading of the hologram on the phase-conjugating device 116 by the reconstruction beam 127 is then time reversed back into the scattering medium 113. This phase-conjugated beam 125 may then serve as the new sample beam 121 for the next iteration of the photon tunneling method as the ultrasound focus 704 is advanced to the next step.

ii. Ultrasonic Modulation

Referring back to FIG. 6, the method of photon tunneling 500 may include focusing an ultrasonic wave near the surface of the scattering medium 113 and ultrasonic modulation or encoding of the diffused coherent light at steps 504 and 506. Referring back to FIG. 2, the ultrasound transducer 114 provides an ultrasound focus 704, or guide star, at a point within the scattering medium 113. The focused ultrasonic wave may be sent by a single-element focused ultrasonic transducer, or by an array of ultrasonic transducers, that is capable of producing an ultrasonic wave localized within the targeted region within the scattering medium 113. The ultrasound focus 704 may be moved iteratively in a step-by-step process.

In an aspect, the initial ultrasound focus 704 may begin within one transport mean free path of light beneath the surface of the scattering medium 113. The length of the transport mean free path may be influenced by the composition of the scattering medium 113 and the wavelength of the coherent light beam 108. In one aspect, the initial ultrasound focus 704 may range from about 0.1 mm to about 1 mm from the surface of the scattering medium 113. In other aspects, the initial ultrasound focus 704 may range from about 0.1 mm to about 0.3 mm, from about 0.2 mm to about 0.4 mm, from about 0.3 mm to about 0.5 mm, from about 0.4 mm to about 0.6 mm, from about 0.5 mm to about 0.7 mm, from about 0.6 mm to about 0.8 mm, from about 0.7 mm to about 0.9 mm, and from about 0.8 mm to about 1 mm from the surface. In one aspect, the first ultrasound focus 704 is essentially at the surface of the scattering medium 113. The ultrasound focus 704 may be moved iteratively in a step-by-step process within the scattering medium 113 along a predetermined path defining the photon tunnel.

The coherent light beam 108 produced by the coherent light source 111, after passing through the optical assembly 112 and acousto-optic modulation device 102, may diffuse and scatter through the scattering medium 113. The portion of the scattered light that is ultrasonically modulated may be considered as emanating from the ultrasound focus 704, as described herein previously. The interference pattern between the ultrasound-modulated portion of the signal beam 122 and the reference beam 126 may generate a stable hologram on the phase-conjugating device 116, which may be read by the reconstruction beam 127 to create a phase-conjugated beam 125 that is illuminated back into the scattering medium 113. The ultrasound focus 704 may be advanced one step to a new ultrasound focus 704 and the ultrasound wave may modulate the phase-conjugated beam 125.

In an aspect, the ultrasound focus 704 may vary in size and shape without limitation. In one aspect, the size and shape of the ultrasound focus 704 may be the same at each iteration step to create a straight or curved photon tunnel of relatively constant cross-sectional area. A straight photon tunnel may be created by iteratively moving the ultrasound focus 704 in a linear path from the surface of the scattering medium 113 to the target within the scattering medium 113. A curved photon tunnel may be created by iteratively moving the ultrasound focus 704 in a non-linear path; a curved photon tunnel may avoid a sensitive or opaque biological structure or any other undesirable structure within the scattering medium 113.

In another aspect, the size and shape of the ultrasound focus 704 may vary from the first ultrasound focus 704 to the position where the ultrasound focus 704 reaches the final target within the scattering medium 113 to create a funnel-shaped photon tunnel. For example, the first ultrasound focus 704 may have a wider diameter than the diameter of the ultrasound focus 704 at each successive step. Without being limited to a particular theory, this initial increase in surface area of the modified sample beam 104 on the scattering medium 113 may increase the energy at the ultrasound focus 704. This may also allow more light to be modulated initially so that more light may reach the final target as the ultrasound focus 704 is narrowed. The dimensions of the ultrasound focus may be constrained according to Eqns. (VII) and (VIII), as described herein above.

In other aspects, any combination of straight vs. curved and/or constant vs. varying cross-sectional areas may be used to define a photon tunnel without limitation.

iii. Recording a Hologram and Phase Conjugation

Referring back to FIG. 6, the photon tunneling method may include recording a hologram at step 506. In various aspects, the hologram may be recorded on a phase-conjugating device 116. By recording the interference pattern of the signal beam 122 and the reference beam 126, the phase-conjugate of the signal beam 122 may be reproduced. The reproduced phase-conjugated beam 125 may be focused back into the scattering medium 113 to the ultrasound focus 704. The phase-conjugating device 116 may be used to record and read the hologram dynamically through any number of write-read cycles without limitation.

This step of recording the hologram from the interference of the signal beam 122 and the reference beam 126 may function essentially as a filter to eliminate various subsets of the signal beam 122 based on at least several criteria. As described herein previously, the only stable interference pattern between the reference beam 126 and signal beam 122 is generated by the interference between the reference beam 126 and the first harmonic of the signal beam 122, which are essentially matched in frequency. In this aspect, the method functions as a filter to essentially remove those components of the signal beam 122 associated with non-modulated photons that bypass the ultrasound focus 704.

In another aspect, the recording of the hologram may also function essentially as a filter to attenuate the contribution of a second subset of the signal beam 122 associated with photons with relatively long path lengths through the scattering medium 113. As described previously herein, the signal beam 122 may include photons that travel a variety of paths through the scattering medium 113, as illustrated in FIG. 7B. Without being limited to any particular theory, the second subset of the signal beam 122 may be associated with photons that traveled a longer path length through the scattering medium 113 than other subsets of the signal beam 122. These longer path lengths are associated with increased scattering of the photons due to the higher likelihood of collision with an object within the scattering medium 113. This second subset of the signal beam 122 may also have a lower intensity relative to other subsets of the signal beam 122, resulting in an attenuated contribution of this second subset to the interference pattern recorded in the hologram.

In yet another aspect, the characteristics of the coherent light source 111, in particular the coherence length of the source's coherent light beam 108, may further function to attenuate the contributions of a third subset of the signal beam through a process of coherence gating. As discussed herein previously, the coherence length ($L_C$) of the coherent light beam 108 is inversely proportional to the frequency bandwidth of the coherent light beam 108. Without being limited to any particular theory, the coherence length of a coherent light beam 108 may be defined functionally as a distance within which coherence of the light is maintained; beyond the coherence length, a light beam may be unable to generate an interference pattern above a threshold contrast. Without being limited to any particular theory, the difference between the path length traveled by the signal beam 122 ($L_S$) and the path length traveled by the reference beam 126 ($L_R$) must be less than the coherence length ($L_C$) in order to produce an interference pattern strong enough to be recorded on the hologram, as defined in Eqn. (X):

$$L_S - L_R < L_C \qquad \text{Eqn. (X)}$$

As described previously herein, the coherence length of the light produced by the coherent light source 111 may range from about 1 mm to about 100 m. If a relatively large coherence length is selected for use in the photon tunneling system 100, then a wide range of differences between $L_S$ and $L_R$ will generate recordable interference signals. However, if a suitably short coherence length is selected, then only the shortest signal beam lengths may produce recordable interference signals. This coherence gating process acts essentially as a filter to further attenuate the contributions of the third subset of the signal beam 122 associated with signal beam 122 path lengths in excess of a predefined threshold value. This predefined threshold value may be specified through the selection of coherence length of the coherent light beam 108 used in the photon tunneling system 100.

iv. Hologram Fixing

Referring back to FIG. 6, the photon tunneling method 500 may further include fixing the hologram on the phase-conjugating device 116 at step 508. The hologram may be fixed after recording but before reading the hologram in an aspect. Without being limited to any particular theory, a key element in implementing photon tunneling is the optical energy gain (G), defined herein as the optical energy ratio between the phase-conjugated beam 125 and the signal beam 122, as defined in Eqn. (XI).

$$G = \frac{\text{Energy of phase} - \text{conjugated beam}}{\text{Energy of signal beam}} \quad \text{Eqn. (XI)}$$

The iteration of TRUE optical focusing used in the photon tunneling method 500 is sustainable only with a gain $G \geq 1$. When a TRUE focusing system uses a photorefractive material as the phase-conjugating device 116, the gain may be far less than unity without hologram fixing. This is because of the dynamic property of the optical phase conjugation based on a photorefractive material. During the holographic reading step, the reconstruction beam 127, while generating a phase-conjugated beam 125, simultaneously erases the existing hologram in the photorefractive material. Without being limited to any particular theory, the total optical energy used in the reconstruction beam 127 may not exceed that of the recording beams 122 and 126 before the existing hologram is completely erased, resulting in a gain of less than unity.

Because the hologram recorded on a photorefractive material fades as it is read, a gain of greater than unity may not be achievable when iteratively creating and reading holograms. If the hologram is not fixed, energy may be lost each time there is an iteration of recording and reading. When using a photorefractive material as the phase-conjugating device 116, a hologram fixing technique may be used to temporarily freeze the existing hologram, allowing a much stronger reconstruction beam 127 to read the hologram for a longer period of time without erasing the hologram. This hologram fixing technique may be used to generate a phase-conjugated beam 125 which may be used as the new sample beam 121 in recording a new hologram as the ultrasound focus 704 is scanned to a new location in the scattering medium 113.

If a hologram is read without hologram fixing, the energy in the phase-conjugated beam 125 may not exceed that in the signal beam 122. However, an intensity gain may be achieved with a higher-intensity reconstruction beam 127. Furthermore, an energy gain much greater than unity may be attained with hologram fixing or two-step recording, as disclosed herein below.

In an aspect, a photorefractive crystal may be fixed thermally, electrically, or by two-step recording. In this aspect, the hologram may be thermally fixed in the PRC. In this aspect, the PRC may be heated above about 90° C. to fix the hologram. The temperature at which the photorefractive crystal may be thermally fixed may depend in part on the composition of the PRC. For example, the hologram may be thermally fixed at a temperature ranging from about 100° C. to about 160° C. in $LiNbO_3$ or $Ba_2NaNb_5O_{15}$ PRCs, or at a temperature of about 300° C. for BSO PRCs, and about 90° C. for BTO PRCs. In various other aspects, the PRC may be heated from about 90° C. to about 110° C., from about 105° C. to about 120° C., from about 110° C. to about 130° C., from about 120° C. to about 140° C., from about 130° C. to about 150° C., from about 140° C. to about 160° C., and from about 150° C. to about 300° C.

In another aspect, the hologram may be electrically fixed in the photorefractive crystal. In this aspect, an electrical field may be applied across the PRC above a threshold field strength to fix the hologram for the time period between the reading of the hologram and the subsequent recording of the subsequent hologram in the iterative process. In an aspect, the applied electrical field strength may range from about 40 V/cm to about 6 kV/cm. In other aspects, the applied electrical field strength may range from about 40 V/cm to about 500 V/cm, from about 300 V/cm to about 1 kV/cm, from about 750 V/cm to about 2 kV/cm, from about 1 kV/cm to about 3 kV/cm, from about 2 kV/cm to about 4 kV/cm, from about 3 kV/cm to about 5 kV/cm, and from about 4 kV/cm to about 6 kV/cm.

In another aspect, the hologram may be fixed using a two-step recording process or a two photon storage process. In this aspect, the PRC may be illuminated by an excitatory beam at an excitatory wavelength characteristic of the composition of the PRC, resulting in the excitation of the charge carriers in the PRC from a bound state into the conduction band, thereby facilitating charge transport and rendering the PRC amenable to recording a hologram. A hologram may be recorded in this aspect by illuminating the PRC with the excitatory beam, the signal beam 122, and the reference beam 126. The recorded hologram may be retained within the PRC by removing the illumination with the excitatory beam. The recorded hologram may be read non-destructively using the reconstruction beam 127 as described herein previously. A new hologram may be recorded by illuminating the PRC with the excitatory beam the signal beam 122, and the reference beam 126 as before.

By way of non-limiting example, a BSO PRC may be illuminated by a 532 nm excitation beam as a 1064 nm signal beam 122 and a 1064 nm reference beam 126 to record a hologram. The hologram may be read non-destructively using a 1064 nm reconstruction beam 127 in the absence of the 532 nm excitation beam. A new hologram may be recorded using the 532 nm excitation beam, the 1064 nm signal beam 122 and the 1064 nm reference beam 126.

In yet another aspect, the hologram may be recorded on a photodetector array such as CCD sensors or CMOS sensors. The recorded hologram may be digitally transferred to a computer, where the phase/amplitude distribution of the wavefront of the ultrasound-modulated light may be resolved, and its phase-conjugated wavefront may be projected onto a spatial light modulator. The interference pattern may be detected by any known photodetector without limitation including, but not limited to a CCD sensor and a CMOS sensor. This technique to detect the interference pattern using a photodetector is referred to herein as digital holography. A CCD camera or CMOS camera may be used to record the interference pattern between the signal beam 122 and a reference beam 126, and the wavefront of the signal beam 122 may be digitally reconstructed from the recorded interference pattern. A phase-conjugated beam 125 may be generated using a reconstruction beam 127 and a spatial light modulator displaying the phase-conjugated wavefront of the ultrasound-modulated component of the signal beam 122. In this manner, the recording of the wavefront of the original signal beam 122 and the construction of its corresponding phase-conjugated beam 125 may no longer need to rely on holographic writing and reading in the same photorefractive material. Using digital holography techniques, an optical gain far greater than unity may be achieved.

v. Hologram Reading and Retro-Reflectively Illuminating a Scattering Medium

Referring back to FIG. 6, the photon tunneling method 500 may further include reading the hologram on the phase-conjugating device 116 and retro-reflectively illuminating the scattering medium 113 at step 510. Referring to FIG. 2, after a hologram is recorded and fixed, the first Pockels cell 131 in front of the first polarizing beam splitter 132 may be tuned such that the sample beam 121 and the reference beam 126 are blocked off and the reconstruction beam 127 passes through.

The reconstruction beam 127 may then illuminate the phase-conjugating device 116 and generate the phase-conjugated beam 125, defined herein as the phase-conjugate of the first harmonic of the signal beam 122. The phase-conjugated beam 125 may retrace the propagation paths of the signal beam 122 to retro-reflectively illuminate the scattering medium 113 and converge to the ultrasound focus 704 of the ultrasound transducer 114 from which the first harmonic component of the signal beam 122 originated. In an aspect, the phase-conjugated beam 125 may be used as the sample beam 121 for illuminating the scattering medium 113 at the next iteration step.

vi. Moving the Ultrasonic Focus and Iteration

Referring back to FIG. 6, the method of photon tunneling 500 may include advancing the ultrasound focus 704 at least one step within the scattering medium at step 512.

The iteration step size of the movement of the ultrasound focus 704 may be limited to a maximum of about one transport mean free path in the scattering medium 113. This iteration step size may maintain the loss of light to absorption and scattering within the scattering medium 113 to within levels suitable for implementing the photon tunneling method. In an aspect, the iteration step size may range from about 0.1 mm to about 1 mm. In other aspects, the iteration step size may range from about 0.1 mm to about 0.3 mm, from about 0.2 mm to about 0.4 mm, from about 0.3 mm to about 0.5 mm, from about 0.4 mm to about 0.6 mm, from about 0.5 mm to about 0.7 mm, from about 0.6 mm to about 0.8 mm, from about 0.7 mm to about 0.9 mm, and from about 0.8 mm to about 1 mm. In one aspect, the iteration step size may be about 0.5 mm.

Without being limited to any particular theory, the time between each iteration step may be selected to be less than the speckle decorrelation time, to attenuate the effects of tissue movement or blood flow changing the local structure of the scattering medium 113 and by extension the intended path of the light. In an aspect, the time between each iteration step may range from about 10 µs to about 1 s. In other aspects, the iteration step time may be from about 10 µs to about 0.5 ms, from about 0.4 ms to about 2 ms, from about 1 ms to about 3 ms, from about 2 ms to about 4 ms, from about 3 ms to about 5 ms, and from about 4 ms to about 1 s. In one aspect, the iteration step time may be about 1 ms.

In an aspect, the method of photon tunneling 500 may include iterating at step 516 the steps of modulating the scattered light and recording a hologram on a phase-conjugating device 506, fixing the hologram 508, reading the hologram to generate a phase-conjugate copy and retro-reflectively illuminating the scattering medium 510, while advancing the ultrasonic focus step wise 512 until the light is focused on the final target within the scattering medium 514.

At each iteration step, the size and/or shape of the ultrasound focus 704 may vary, as described herein above. The direction of the iteration step may also vary to curve or change the overall shape of the photon tunnel. Thus, the overall shape of the photon tunnel may include, but is not limited to, a straight, cone, or curved tunnel. The diameter of the ultrasound focus 704 may be dependent on at least one of several factors including, but not limited to ultrasound wavelength, ultrasound transducer aperture, and ultrasound transducer focal length, as described herein above. In an aspect, the photon tunnel may take the least loss path, defined herein as the path with the lowest losses to diffusion within the scattering medium 113.

In an aspect, the phase-conjugated beam 125 may repeatedly illuminate the scattering medium 113 using the same ultrasound focus 704 location to sharpen the signal beam 122 intensity returned from the scattering medium 113 before the ultrasound focus 704 is moved to the next step. Repeated illumination using the same location of the ultrasound focus 704 may further act to straighten the photon tunnel path within the scattering medium 113.

III. Systems and Methods for Illumination Using Wavefront Shaping

In an additional aspect, wavefront shaping (WFS) systems and methods to illuminate a region within a scattering medium is provided. In this additional aspect, focusing within the scattering medium may be achieved by spatially tailoring the phase distribution of an illuminating beam using phase-shifting arrays including, but not limited to spatial light modulators or digital mirror displays, to maximize a feedback received from a virtual guide star. Like the TRUE optical focusing system and methods described herein above, the WFS system generates an illuminating beam with a phase distribution that is configured to maximize the light intensity delivered to a region within the scattering medium. However, while the TRUE optical focusing system uses optical phase conjugation to reflect photons back along the scattering pathways taken from the focus region to a phase-conjugating device, the WFS system delivers an illuminating beam with a phase distribution that is iteratively optimized to maximize a feedback associated with the light intensity within the focus region.

Figure 13:
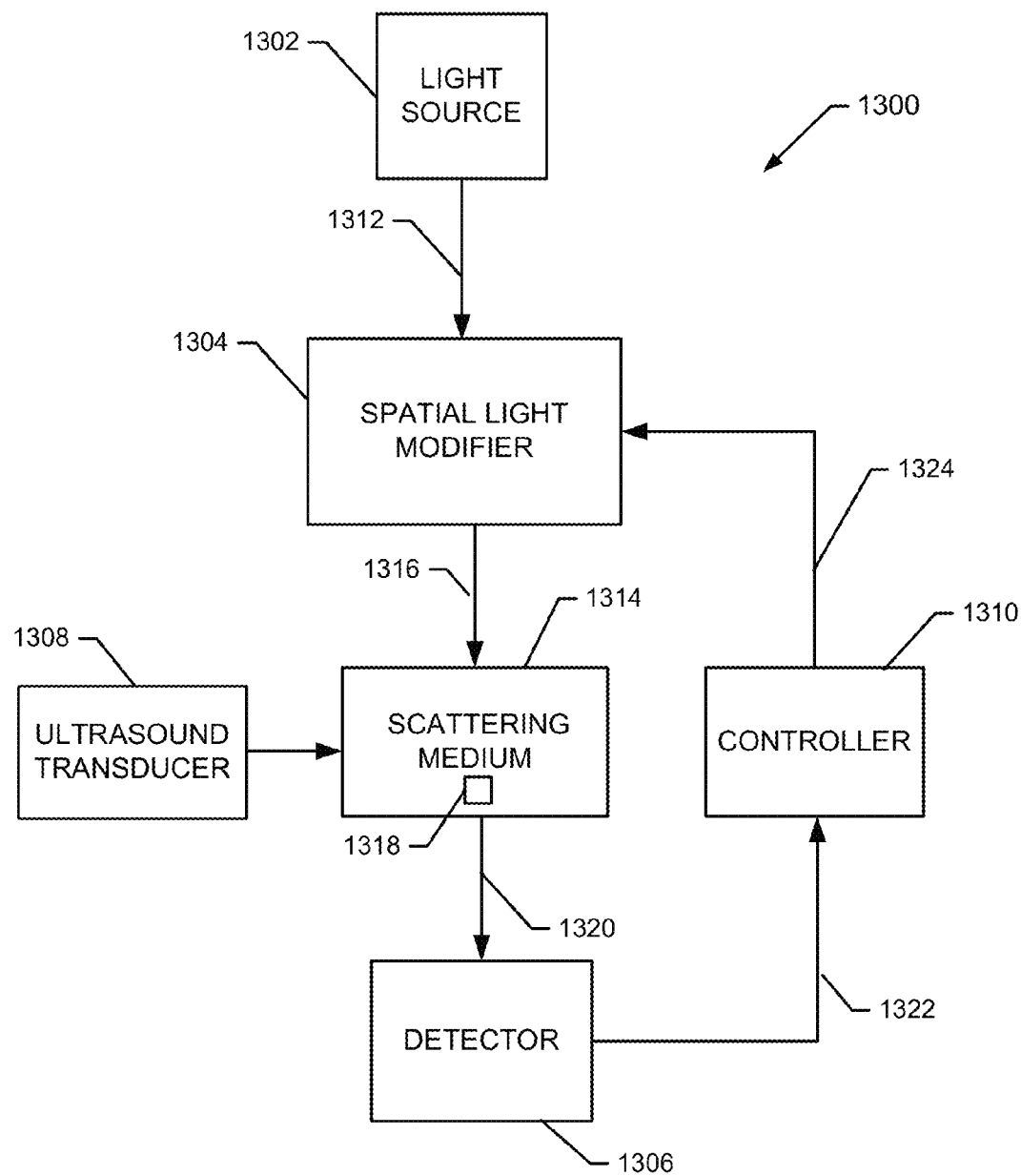
FIG. 13 is a block diagram illustrating the elements of a photon tunneling system based on digital ultrasonically encoded (DUE) optical focusing.

FIG. 13 is a schematic diagram of a WFS system 1300 in an aspect. The WFS system 1300 may include, but is not limited to, a coherent light source 1302 spatial light modifier 1304, a detector 1306, an ultrasound transducer 1308, and a controller 1310.

In this aspect, the coherent light source 1302 may produce a coherent light beam 1312 at an essentially constant wavelength that may be used to illuminate structures within a scattering medium 1314 after modification by the spatial light modifier 1304. The coherent light beam 1312 may be delivered to the spatial light modifier 1304 and modified into an illuminating beam 1316 with a predetermined phase distribution. The illuminating beam 1316 may illuminate the scattering medium 1314 and be modulated by the ultrasound focus 1318 of the ultrasound transducer 1308, which may be situated within the scattering medium 1314. The portion of the illuminating beam 1316 that is modulated by the ultrasound focus 1318 may emerge from the scattering medium 1314 as a signal beam 1320. The signal beam 1320 may be detected by a detector 1306 configured to selectively receive only the ultrasound-modulated portion of the illuminating beam 1316, corresponding to the light passing through the ultrasound focus 1318. The detector 1306 may use any of the devices and methods described herein above for detecting ultrasound-modulated light beams including, but not limited to: photorefractive measurement devices, CD or CMOS cameras recording interference patterns, spatial light modulators, photodiodes, and any combination thereof.

The output of the detector 1306 may be delivered to the controller 1310 as a feedback signal 1322. This feedback signal 1322 is representative of the amount of light delivered within the ultrasound focus 1318. In various aspects, the feedback signal 1322 delivered to the controller 1310 may depend on any one or more of at least several factors including, but not limited to the type of detector 1306 included in the WFS system 1300, the type of control algorithm implemented by the controller 1310, characteristics of the scattering medium 1314, and the type of device incorporating the WFS system 1300. Non-limiting examples of suitable feedback signals 1322 include measurements of the average intensity of light within the signal beam 1320, a spatial dimension such as beam diameter of a region within the signal beam characterized by a significantly higher intensity than adjacent regions, a ratio of highest intensity and lowest intensity measured within the signal beam 1320, and any combination thereof.

In an aspect, the controller 1310 processes the feedback signal 1322 and delivers a control signal 1324 to the SLM 1304. The control signal 1324 configures the SLM 1304 such that the illuminating beam 1316 includes the desired phase distribution. This control signal 1324 is generated by the controller 1310 using a feedback control algorithm. This feedback control algorithm iteratively modified the control signal 1324 in order to modulate the feedback signal 1322 until a feedback signal 1322 associated with a maximum illumination within the ultrasound focus 1318 is achieved.

Any known feedback control algorithm may be used with the WFS system 1300 without limitation. Non-limiting examples of suitable feedback control algorithms include proportional control, PID control, and control algorithms making use of artificial intelligence algorithms such as evolutionary algorithms and genetic algorithms, and any other suitable control algorithm known in the art.

In one aspect, the feedback control algorithm may be a genetic control algorithm. In this aspect, different configurations of the SLM 1304 resulting in illuminating beams 1316 in multiple iterations are compared. Those configurations resulting in the feedback signal 1322 associated with the highest illumination within the ultrasound focus 1318 are retained until the SLM configuration converges on an optimal SLM configuration after multiple iterations and comparisons of feedback signals 1322 associated with candidate SLM configurations.

In another aspect, the number of iterations used to determine the phase distribution of the illuminating beam 1316 by the feedback control algorithm may vary depending one or more of at least several factors including, but not limited to: the desired degree of optimization of the phase distribution; one or more characteristics of the spatial light modifier such as the type of spatial light modifier, the number of phase modifying elements in the array and the sensitivity/resolution of individual phase modifying elements; one or more characteristics of scattering medium; the intended use of the illuminating beam; characteristics of the particular detector 1306 such as the type of detector, sensor resolution and sensor response range and sensitivity; one or more characteristics of the feedback control algorithm such as gains, limits, and control laws; and any combination thereof.

Figure 10:
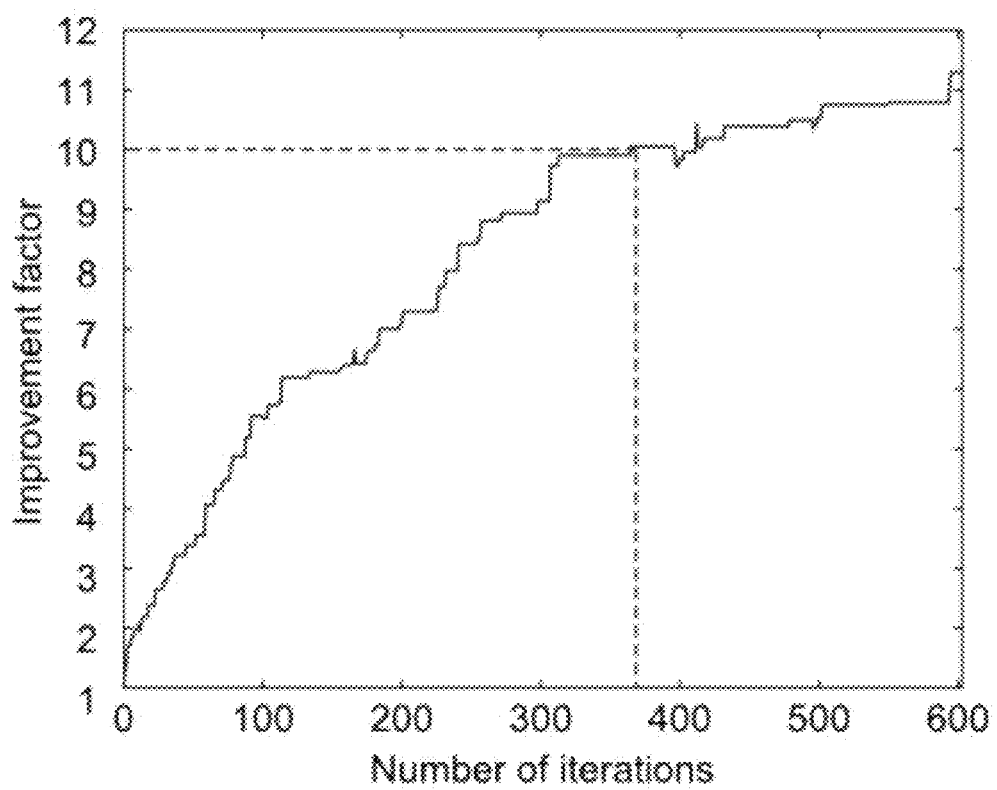
FIG. 10 is a graph summarizing the improvement in the ultrasonically encoded light intensity within a focus region illuminated by a beam with an optimized phase distribution at each iterative step of an optimization algorithm.

In one aspect, the degree of optimization of the phase distribution may increase stepwise with each successive iteration of the feedback control algorithm and may approach a maximum optimization in an asymptotic manner, as illustrated in FIG. 10 by way of non-limiting example. In another aspect, the number of iterations may be selected such that the degree of optimization of the illuminating beam 1316 is at least 80% of the maximum optimization. In yet other aspects, the number of iterations may be selected such that the degree of optimization of the illuminating beam 1316 is at least 85%, at least 90%, at least 95%, at least 98%, at least 99%, and at least 99.5% of the maximum optimization.

In another aspect, the number of iterations used to optimize the phase distribution of the illuminating beam 1316 by the feedback control algorithm may be up to about 10,000 iterations or more. In other aspects, the number of iterations may be up to about 10,000 iterations, up to about 5,000 iterations, up to about 2,000 iterations, up to about 1,000 iterations, up to about 500 iterations, up to about 400 iterations, up to about 300 iterations, up to about 200 iterations, and up to about 100 iterations.

The WFS system 1300 may be used to illuminate a focus region (corresponding to the ultrasound focus) within a scattering medium using separate devices for the generation of the illuminating beam and the detection of the illumination within the focus region. As a result, the illuminating beam 1316 and signal beam 1320 need not be aligned in order to illuminate the focus region.

The controller 1310 may further produce additional signals (not shown) including, but not limited to: optical-control signals to control the timing of the delivery of the illuminating beam 1316, detector control signals to operate the detector 1306, and transducer control signals to control the timing, location, and spatial extent of the ultrasound beam to the ultrasound focus 1318 by the ultrasound transducer 1308. The controller 1310 may be any controller similar to the controller described herein above in connection with the TRUE optical focusing system The WFS system 1300 may further include an electronic system (not shown) which may include, but is not limited to, scanner drivers and controllers, amplifiers, digitizers, laser wavelength tuning systems, computers, processors, displays, storage devices, and any combination thereof. The WFS system 1300 may further include a scanning apparatus (not shown) to operate the WFS system 1300 in a scanning mode including, but not limited to a raster scanning mode. One or more components of the WFS system 1300 may be in communication remotely with one or more components of the electronic system, the scanning apparatus, or both.

III. Devices Incorporating Photon Tunneling and/or Waveform Shaping Systems

In various aspects, the photon tunneling system 100 and/or waveform shaping system 1300 may be incorporated into a variety of devices including, but not limited to, microscopes and other imaging systems. Examples of devices that incorporate the photon tunneling system 100 and/or waveform shaping system 1300 in various aspects are described herein below. Although the examples described herein below describe devices incorporating the photon tunneling system 100, similar devices incorporating the waveform shaping system 1300 are also included in various aspects.

a. Ultrasound-Modulated Optical Imaging System

FIG. 3 is a diagram of an aspect of an ultrasound-modulated optical imaging system 200 based on optical time reversal by ultrasonic encoding similar to the imaging system shown in FIG. 2. This ultrasound-modulated optical imaging system 200 includes an ultrasound transducer array 214 used to transmit a focused ultrasonic wave to the ultrasound focus 704 and to modulate the diffuse light in the region of interest inside the scattering medium 213. In an aspect, the ultrasonic transducer array 214 may be tuned so that the ultrasonic wave that modulates the diffuse light when the biological tissue 213 is illuminated by the time reversed light 225 has a tighter focus than the ultrasonic wave that modulated the modified sample beam 204 at the previous iteration step.

The system 200 further includes a signal detector 217 to detect the ultrasound-modulated light 228 resulting from the diffusion of the time reversed light 225 through the scattering medium 213. The ultrasound-modulated light 228 has a much higher modulation depth because most of the time reversed light 225 was previously modulated by the ultrasound focus 704 using the photon tunneling method. As a result, the ultrasound-modulated optical imaging 200 in this aspect may have a higher signal-to-noise ratio than a conventional ultrasound-modulated optical imaging system that does not make use of photon tunneling methods.

b. Transmission-Mode Fluorescence Microscope

Figure 4:
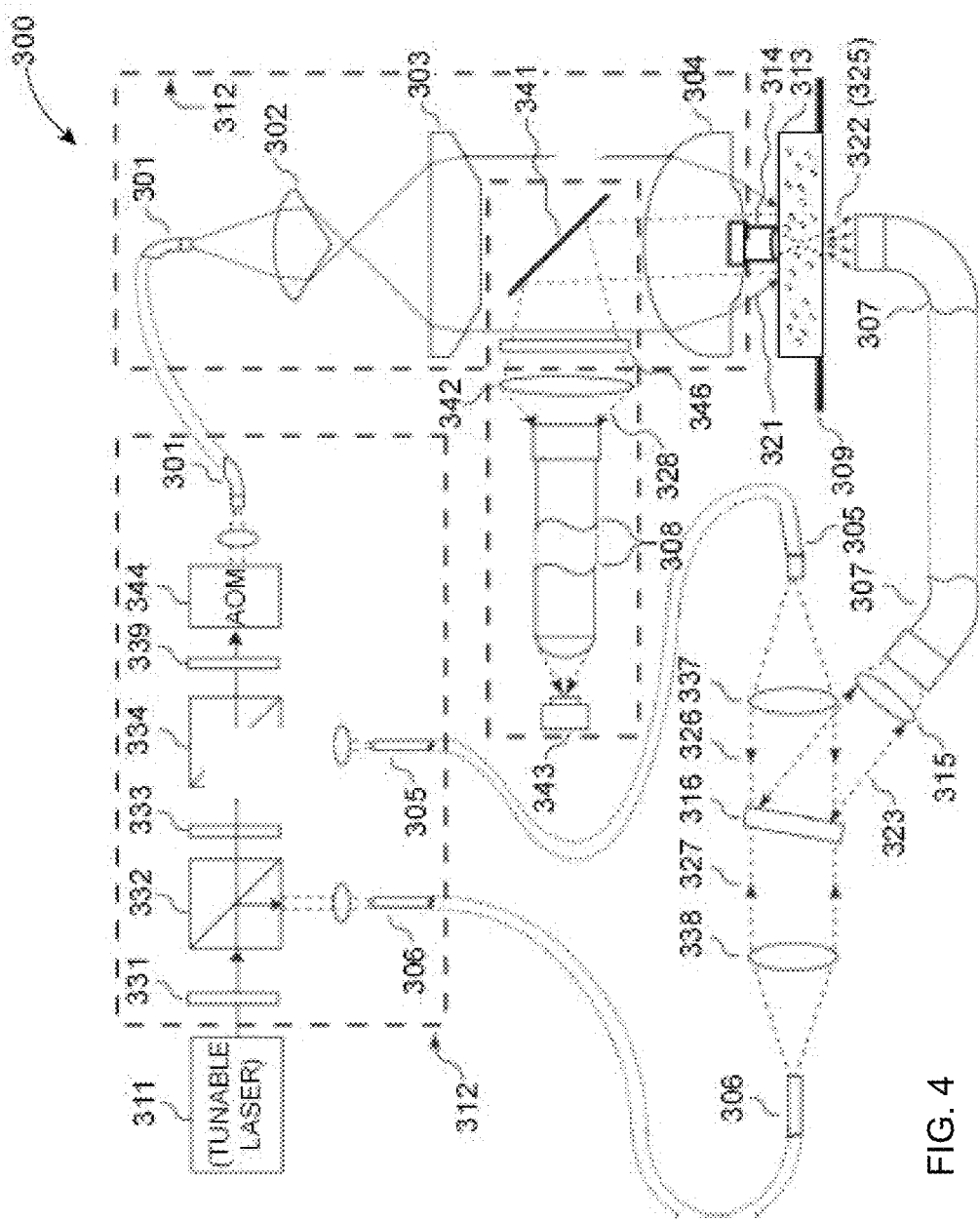
FIG. 4 is a diagram of another alternative aspect of a transmission mode fluorescence microscope based on optical time reversal by ultrasonic encoding.

FIG. 4 is a diagram of a transmission-mode fluorescence microscope 300 that incorporates photon tunneling methods in another aspect. In this aspect, coherent light produced by a laser 311 may be divided by two successive polarizing beam splitters 332 and 334 into three polarization-maintaining optical fibers 301, 305, and 306. Two Pockels cells 331 and 333, each positioned in front of its corresponding beam splitter 332 and 334, control the intensity of the light that is coupled into the optical fibers 301, 305, and 306. A half wave plate 339 positioned after the second beam splitter 334 aligns the polarization of light coupled into the first optical fiber 301 to the polarization of light coupled into the second and third optical fibers 305 and 306.

In this aspect, the light produced by the laser 311 may be frequency shifted by an AOM 344 by an amount equivalent to the center frequency $f_a$ of an ultrasonic transducer 314, transmitted by the first optical fiber 301 through three aspheric lenses 302, 303, and 304, and annularly focused into the scattering medium 313. A signal beam 322 emerging from the scattering medium 313 may be delivered by an optical fiber bundle 307 and condensed by a lens 315 to a phase-conjugating device 316. After retro-reflection, a phase-conjugated beam 325 from the phase-conjugating device 316 may be delivered by the optical fiber bundle 307 to illuminate the scattering medium 313.

The phase-conjugated beam 325 may retrace the propagation paths of the diffuse photons of the corresponding signal beam 322 that previously traversed the ultrasound focus 704. The two mutually conjugated reference light beams necessary for the recording of the amplitude/phase distribution of the signal beam 322 and the production of the phase-conjugated beam 325 using the phase-conjugating device 316 may be delivered by the second and third optical fibers 305 and 306. The reference beam 326 delivered by the second optical fiber 305 may be collimated by a first lens 337, and the reconstruction beam 327 delivered by the third optical fiber 306 may be collimated by a second lens 338. The alignment of the reference beam 326 and the reconstruction beam 327 is situated to result in both beams constituting a mutually conjugated pair. The interference pattern between the reference light beam 326 and the signal beam 323 from the optical fiber bundle 307 is holographically recorded into the phase-conjugating device 316. After the hologram is engraved, the two Pockels cells 331 and 333 may be tuned to block off the light beam 321 and the reference beam 326 and to allow the passage of the reconstruction beam 327 in order to read out the hologram and generate the phase-conjugated beam 325. The hologram may be fixed as described herein below in an aspect.

In another aspect, fluorescent light 328 may be excited by the phase-conjugated beam 325 in the target region of interest inside the scattering medium 313. The fluorescent light 328 may be transmitted through the third aspheric lens 304, reflected by a dichroic beam splitter 341, transmitted through an optical filter 346 and a focusing lens 342, and coupled into an optical fiber 308 before being detected by a photo detector 343. The intensity of the fluorescent light 328 may be detected and transferred to a computer for signal analysis to recover an image of the scattering medium 313 from a raster scan or 3D scan. A loading stage 309 may be raster scanned so that the entire region of interest of the biological tissue 313 may be imaged.

The ultrasound focus 704 may be moved within the scattering medium 113 and the phase-conjugated beam 325 produced at a first position of the ultrasound focus 704 may be used as the sample beam 321 to be modulated by the ultrasound wave associated with a second position of the ultrasound focus 704 resulting from the movement of the ultrasound focus 704 as part of the iterative photon tunneling process.

c. Reflection-Mode Fluorescence Microscope

Figure 5:
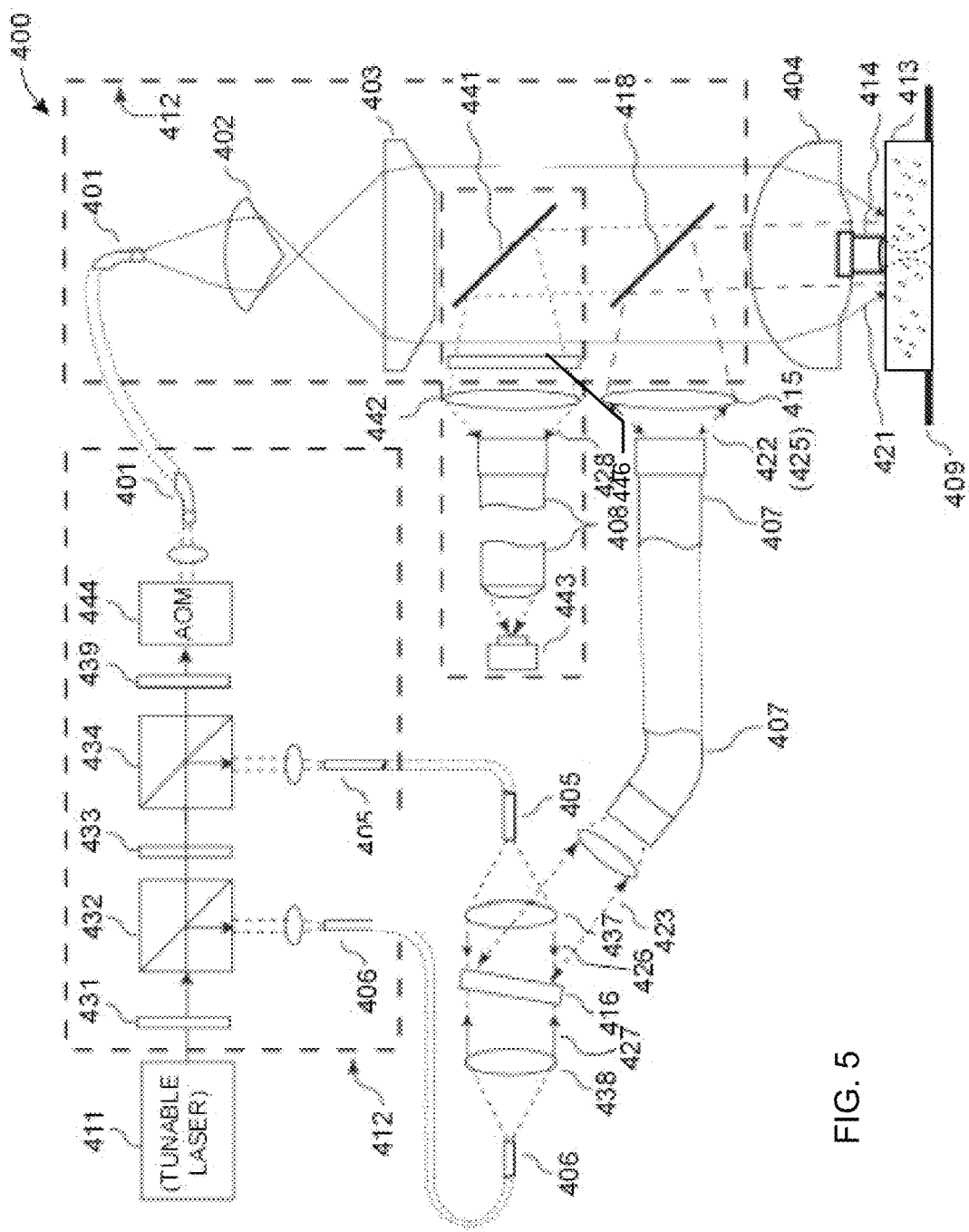
FIG. 5 is a diagram of another alternative aspect of a reflection-mode fluorescence microscope based on optical time reversal by ultrasonic encoding.

FIG. 5 is a diagram of a reflection-mode fluorescence microscope 400 based on optical time reversal by ultrasonic encoding in another additional aspect. In this aspect, the reflection mode fluorescence microscope 400 is similar to the transmission-mode fluorescence microscope 300 shown in FIG. 4, except that back-scattered fluorescent light 422 may be collected from the incident side of a modified sample beam 421, reflected by a dichroic beam splitter 418, and coupled by a focusing lens 415 into one or more fiber bundles 407. In this aspect, coherent light produced by a laser 411 may be divided by two successive polarizing beam splitters 432 and 434 into three polarization-maintaining optical fibers 401, 405, and 406. Two Pockels cells 431 and 433, each positioned in front of its corresponding beam splitter 432 and 434, control the intensity of the light that is coupled into the optical fibers 401, 405, and 406. A half wave plate 439 positioned after the second beam splitter 434 aligns the polarization of light coupled into the first optical fiber 401 to the polarization of light coupled into the second and third optical fibers 405 and 406.

In this aspect, the light produced by the laser 411 may be frequency shifted by an AOM 444 by an amount equivalent to the center frequency $f_a$ of an ultrasonic transducer 414, transmitted by the first optical fiber 401 through three aspheric lenses 402, 403, and 404, and annularly focused into the scattering medium 413. A back-scattered signal beam 422 emerging from the scattering medium 413 may be delivered by an optical fiber bundle 407 and collimated by a lens 415 to a phase-conjugating device 416. After retro-reflection, a phase-conjugated beam 425 from the phase-conjugating device 416 may be delivered by the optical fiber bundle 407 to illuminate the scattering medium 413.

The phase-conjugated beam 425 may retrace the propagation paths of the diffuse photons of the corresponding signal beam 422 that previously traversed the ultrasound focus 704. The two mutually conjugated reference light beams necessary for the recording of the amplitude/phase distribution of the signal beam 422 and the production of the phase-conjugated beam 425 using the phase-conjugating device 416 may be delivered by the second and third optical fibers 405 and 406. The reference beam 426 delivered by the second optical fiber 405 may be collimated by a first lens 437, and the reconstruction beam 427 delivered by the third optical fiber 406 may be collimated by a second lens 438. The alignment of the reference beam 426 and the reconstruction beam 427 is situated to result in both beams constituting a mutually conjugated pair. The interference pattern between the reference light beam 426 and the signal beam 423 from the optical fiber bundle 407 is holographically recorded into the phase-conjugating device 416. After the hologram is engraved, the two Pockels cells 431 and 433 may be tuned to block off the light beam 421 and the reference beam 426 and to allow the passage of the reconstruction beam 427 in order to read out the hologram and generate the phase-conjugated beam 425. The hologram may be fixed as described herein below in an aspect.

In another aspect, fluorescent light 428 may be excited by the phase-conjugated beam 425 in the target region of interest inside the scattering medium 413. The fluorescent light 428 may be transmitted through the third aspheric lens 404, reflected by a dichroic beam splitter 441, transmitted through an optical filter 446 and a focusing lens 442, and coupled into an optical fiber 408 before being detected by a photo detector 443. The intensity of the fluorescent light 428 may be detected and transferred to a computer for signal analysis to recover an image of the scattering medium 413 from a raster scan or 3D scan. A loading stage 409 may be raster scanned so that the entire region of interest of the biological tissue 413 may be imaged.

The ultrasound focus 704 may be moved within the scattering medium 113 and the phase-conjugated beam 425 produced at a first position of the ultrasound focus 704 may be used as the sample beam 421 to be modulated by the ultrasound wave associated with the ultrasound focus 704 at a second position resulting from the movement of the ultrasound focus 704 as part of the iterative photon tunneling process.

DEFINITIONS

To facilitate the understanding of the aspects described herein, a number of terms are defined below. Terms defined herein have meanings as commonly understood by a person of ordinary skill in the arts relevant to the aspects described herein. Terms such as "a," "an," and "the" are not intended to refer to only a singular entity, but include the general class of which a specific example may be used for the illustration. The terminology herein is used to describe specific aspects of the present disclosure, but their usage does not limit the disclosure to the aspects described herein, except as outlined in the claims.

To be consistent with the commonly used terminology, whenever possible, the terms used herein will follow the definitions recommended by the Optical Society of America (OCIS codes).

In some aspects, the term "ultrasound-modulated optical tomography" refers generally to a diffuse light imaging technology that detects diffuse light emanating from a turbid scattering medium, such as a biological tissue, that is modulated by ultrasonic wave focused in the region of interest inside the volume. Tomographic information of the optical properties of the scattering medium with ultrasound resolution may be obtained by raster scanning the ultrasound beam through the scattering medium.

In some aspects, the terms "optical phase conjugation," "wavefront reversal," and "time-reversal reflection" refer generally to a process that precisely reverses the direction of propagation of each plane wave in an arbitrary light beam, thereby causing the return beam to exactly retrace the path of the incident beam.

In some aspects, the term "photorefractive material" refers generally to a class of materials whose index of refraction changes when exposed to light because of electro-optic and photoconductive effects.

In some aspects, the term "transducer array" refers generally to an array of ultrasonic transducers.

In some aspects, the terms "focused ultrasonic detector," "focused ultrasonic transducer," and "focused piezoelectric transducer" refer generally to a curved ultrasonic transducer with a hemispherical surface or a planar ultrasonic transducer with an acoustic lens attached or an electrically focused ultrasonic array transducer.

In some aspects, the terms "transducer array" and "phase array transducer" refer generally to an array of piezoelectric ultrasonic transducers.

EXAMPLES

The following examples are provided to illustrate various aspects of the disclosure.

Example 1

Digital Ultrasonically Encoded (DUE) Optical Focusing Using Prototype Iterative Feedback System To demonstrate the feasibility of using an iterative feedback method to shape the phase distribution across a wavefront of light to enhance transmission through a scattering medium, the following experiment was conducted.

A prototype system, shown schematically in FIG. 8, was used to demonstrate DUE optical focusing an iterative feedback focusing method as described herein above. The prototype system 800 includes a spatial light modulator (SLM) 802, divided into 20×20 independently controlled segments, to shape the incident wavefront 804 delivered by a coherent light source 806. The SLM response was modulated by control signals 808 received from a computer 810; the SLM response was calibrated to provide a linear phase shift of $2\pi$ over 191 grayscale values for each segment. To simulate light transmission through a scattering medium, the phase-shifted wavefronts 812 were delivered to an optical element 814 that focused the light into a first diffuser 816, through a clear gelatin medium 818, through a second diffuser 820 and into an optical fiber bundle 822. Viewed head-on, the diffusers appeared opaque, and no focus was formed after the first diffuser 816.

Six pulses from a 6 MHz ultrasonic transducer 824 were used to modulate each light pulse passing through the clear gelatin medium 818, and the intensity of the resulting ultrasonically encoded (UE) light 834 was measured using a photorefractive (PR) detection device 826 similar to the photorefractive detection devices described herein above. The output 828 of the photorefractive detection device 826 was collected by a photodiode 830. The output 832 of the photodiode 830, which encoded the intensity of the ultrasonically encoded (UE) light 834, was delivered to the computer 810. The computer 810 implemented a genetic optimization algorithm described previously herein above. As described previously, the genetic optimization algorithm repeatedly generated a control signal 808 used to modify the response of the SLM device 802 over numerous cycles of light pulses delivered by the coherent light source 806 in order to enhance the intensity of the ultrasonically encoded (UE) light 826 received by the photodiode 830.

The intensity of the ultrasonically encoded (UE) light 834 emerging from the diffusers 816/820 and clear gelatin medium 818 after illumination by a randomly phase-shifted wavefront was measured and compared to the corresponding intensity after illumination by a phase-shifted wavefront optimized by the genetic optimization algorithm after 600 iterations of the algorithm. The results of this experiment are summarized in FIGS. 9 and 10.

Figure 9:
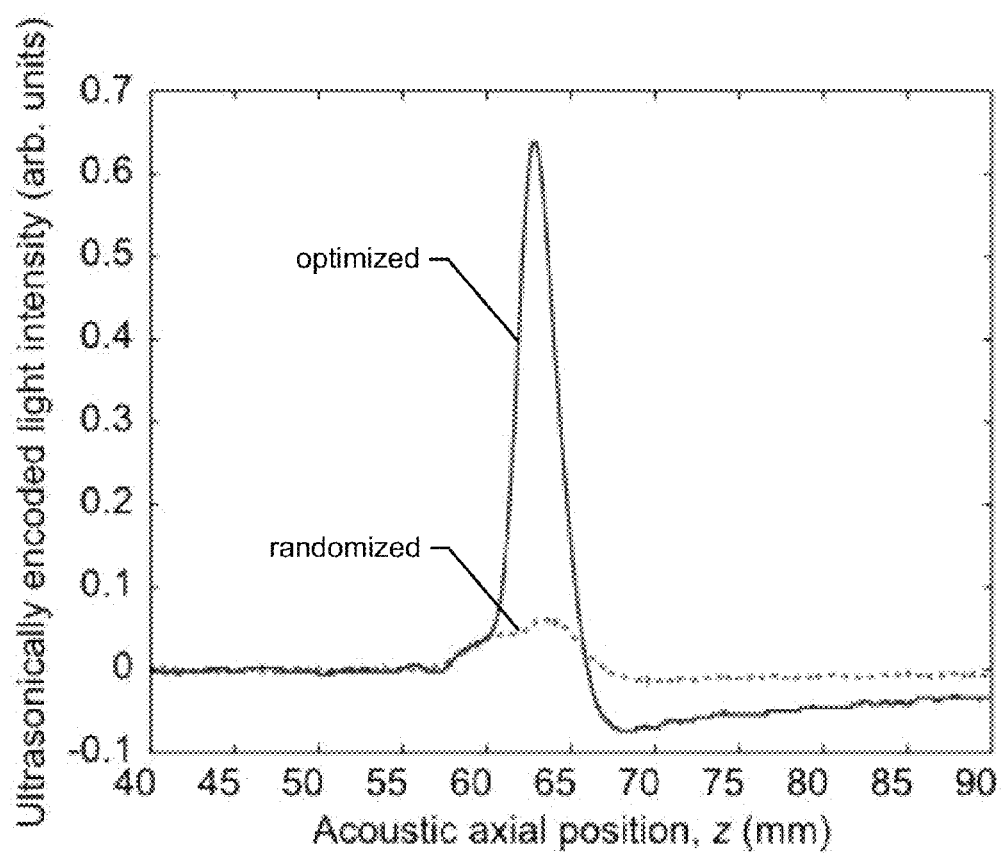
FIG. 9 is a graph comparing the ultrasonically encoded light intensity within a focus region illuminated by a beam with a randomized phase distribution and a beam with an optimized phase distribution.

FIG. 9 summarizes the intensity of ultrasonically encoded light (averaged over 75 samples) received by the photodiode 830 as a function of position within the region subjected to ultrasonic pulses from the ultrasonic transducer 824. As illustrated in FIG. 9, the peak intensity of ultrasonically encoded light 834 generated using the optimized pulse wavefront 812 was over ten times the corresponding peak intensity generated using the randomized wavefront 812. By maximizing the ultrasonically encoded signal, the light intensity within the acoustic focal region formed an optical focal spot within the clear gelatin medium 818.

FIG. 10 is a graph summarizing the increase in intensity of the ultrasonically encoded (UE) light 834 emerging from the diffusers 816/820 and clear gelatin medium 818 over 600 iterations of the genetic optimization algorithm as described herein previously. As illustrated in FIG. 10, the light intensity increased about 10-fold after about 370 iterations, and showed a modest increased from 10-fold to 11-fold of the initial intensity between 370 iterations and 600 iterations of the genetic optimization algorithm.

The results of this experiment demonstrated the feasibility of using an iterative feedback method to shape the phase distribution across a wavefront of light to enhance transmission through a scattering medium. Illumination using a wavefront shaped by the feedback method resulted in a 10-fold increase in light intensity within the focal area compared to a randomly-shaped wavefront.

Example 2

Assessment of Effectiveness of Digital Ultrasonically Encoded (DUE) Optical Focusing Using Prototype Iterative Feedback System To demonstrate the effectiveness of using an iterative feedback method to shape the phase distribution across a wavefront of light to enhance transmission through a scattering medium, the following experiment was conducted.

Figure 8:
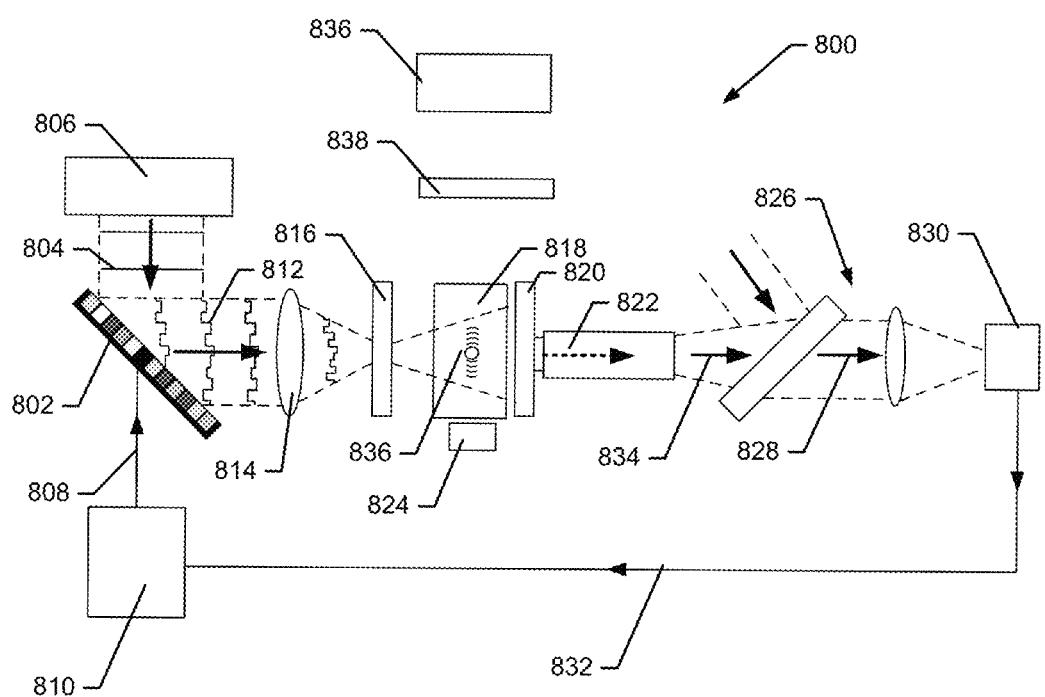
FIG. 8 is a diagram of an aspect of a photon tunneling system based on digital ultrasonically encoded (DUE) optical focusing.
Figure 11:
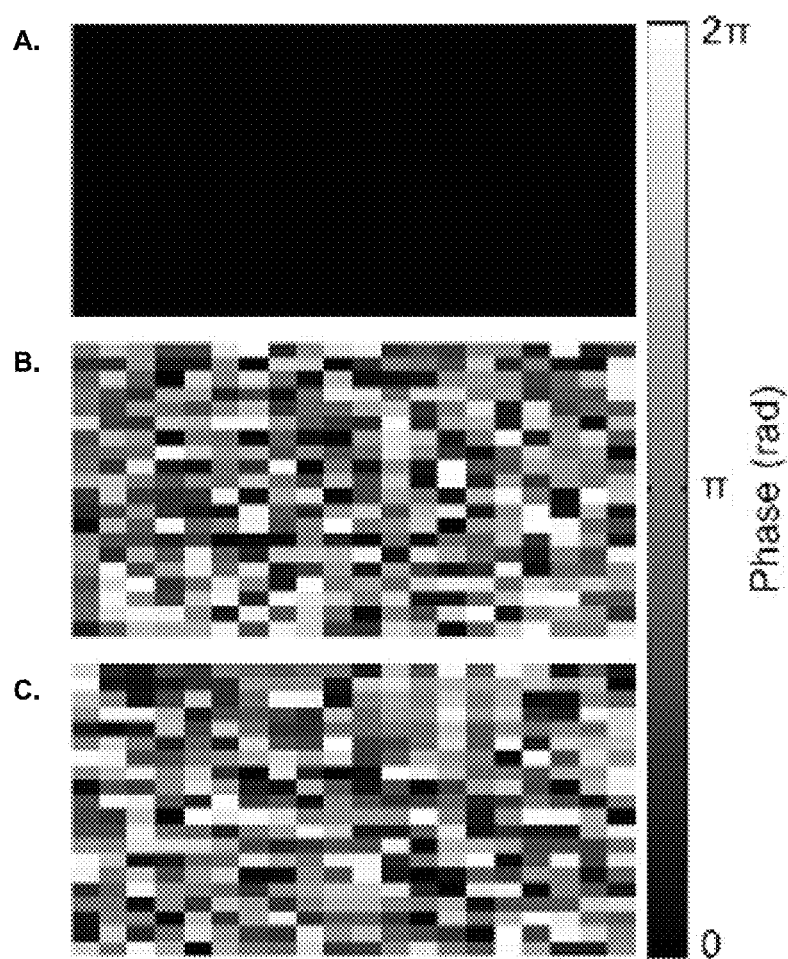
FIG. 11A-C are images illustrating the phase distributions of light beams having a uniform phase distribution (FIG. 11A), a random phase distribution (FIG. 11B), and an optimized phase distribution (FIG. 11C).

The prototype system of Example 1, shown schematically in FIG. 8, was used to implement DUE optical focusing the genetic optimization algorithm as described in Example 1. To assess the effectiveness of DUE optical focusing, a bar 836 containing fluorescent quantum dots was embedded within the clear gelatin medium 818 within the focal region of the system. The bar was situated in a horizontal orientation (perpendicular to the plane of the page as illustrated in FIG. 8) and had a 1 mm×1 mm square cross-sectional profile. Referring again to FIG. 8, a CCD 836 outfitted with a longpass filter 838 was used to measure the intensity of the light produced by the fluorescent quantum dots as a result of illumination by the prototype DUE optical focusing system 800. To assess the effectiveness of the prototype DUE focusing system 800, the bar 836 was illuminated with light pulses characterized by three different wavefronts, illustrated in FIG. 11A-C: 1) a uniform phase pattern (FIG. 11A); 2) a randomized phase pattern (FIG. 11B); and 3) a phase pattern optimized over 600 iterations of the genetic optimization algorithm (FIG. 11C).

Figure 12:
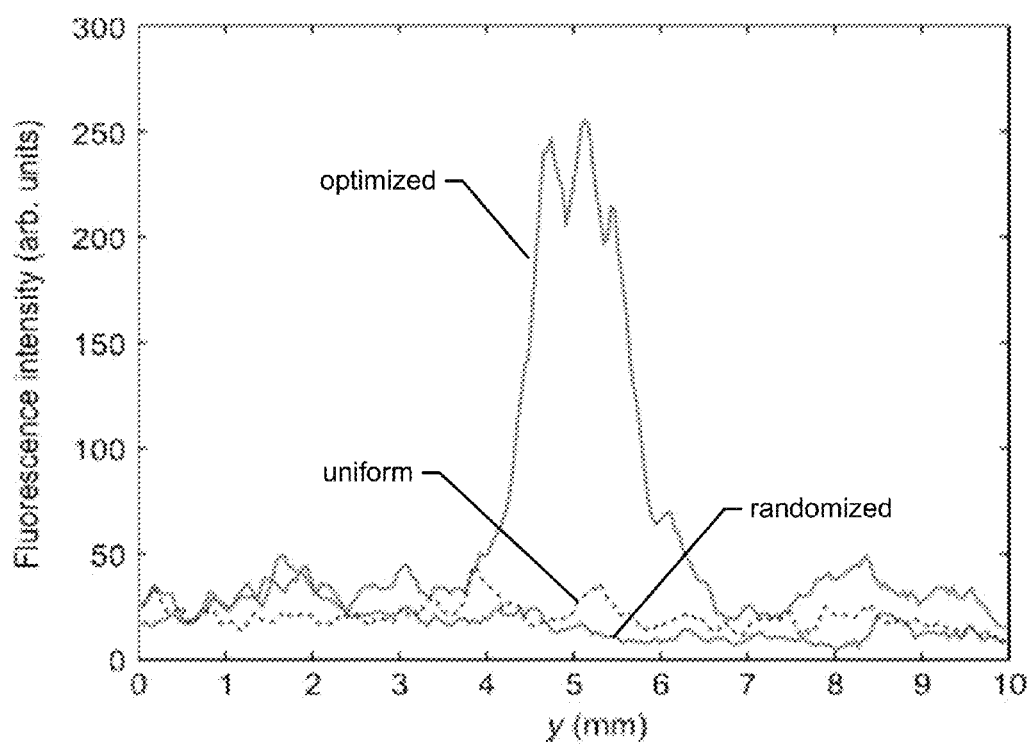
FIG. 12 is a graph comparing the fluorescence intensity of fluorescent quantum dots as a result of illumination by light beams having a uniform phase distribution, a random phase distribution, and an optimized phase distribution.

The results of this experiment are summarized in FIG. 12. The fluorescent intensity resulting from the randomized phase pattern and the uniform phase pattern were essentially equal, indicating that the wavefront was completely scrambled by the first diffuser. The optimized phase pattern resulted in a ten-fold increase in fluorescent intensity. Based on an analysis of a CCD image (not shown), the focal spot produced by the optimized phase pattern appeared to be larger than the width of the acoustic beam (300 μm), possibly due to acoustic sidebands.

The results of this experiment demonstrated that the use of an iterative feedback method to shape the phase distribution across a wavefront of light enhanced the intensity of light through a scattering medium ten-fold relative to a wavefront with a uniform or random phase pattern.

Example 3

Sensitivity of Phase Distribution Optimization Procedure Using Simulated WFS System To assess the sensitivity of the optimization of phase distribution to the characteristics of the prototype DUE optical focusing system 800, the following experiment was conducted.

The genetic optimization algorithm and DUE optical focusing system 800 described previously in Example 1 were simulated to assess the sensitivity of the light intensity generated within the media 818 in the focus region to the number of elements in the array of the A simulation of the optimization of the phase distribution of the light modulator (SLM) 802.

Without being limited to any particular theory, it is known in the art that the expected increase in intensity $\eta$ is equal to the ratio of the number of independent SLM segments N to the number of speckle grains in the ultrasound focus M, according to Eqn. (XII):

$$\eta = \frac{N+1}{M} \qquad \text{Eqn. (XII)}$$

A simulation was developed to model the expected increase in intensity. To calibrate this simulation, the dimensions of the prototype DUE optical focusing system 800 were used to predict the expected increase in intensity $\eta$ for this system. Based on an illumination diameter of 1 mm and a distance of 20 cm from the first diffuser 816 to the acoustic focus 130 μm speckle grains were expected at the acoustic focal plane. Five acoustic pulses at 6 MHz, equivalent to a length of 1.25 mm, were used in the simulation to modulate the light. This pulse length, along with the acoustic transverse width, yielded a calculated 22 ultrasonically encoded speckles. Hence, according to Eqn. (XII), the predicted increase in intensity ($\eta$) was about 18. This predicted increase in intensity compared favorably with the measured increase in intensity of about 11, as illustrated in FIGS. 9 and 10.

Eqn. (XII) predicted that increasing the number of blocks on the SLM pattern may increase the amount of light that can be delivered to the target region. However, the simulation indicated that the number of iterations required to optimize the phase pattern also scaled linearly with the number of controlled blocks in the spatial light modulator (SLM) 802. The simulation predicted that for a given number of iterations of the genetic optimization algorithm, the intensity increase was unchanged due the opposed effects of enhanced light delivery but higher number of iterations to optimize the phase distribution associated with increasing the number of controlled blocks in the spatial light modulator (SLM) 802.

The results of this experiment indicated that the number of controlled blocks in the spatial light modulator (SLM) 802 had little effect on the number of iterations needed to enhance the illumination within a focus region by a desired amount.

Having described the invention in detail, it will be apparent that modifications and variations are possible without departing from the scope of the invention defined in the appended claims. Those of skill in the art should, however, in light of the present disclosure, appreciate that many changes could be made in the specific embodiments that are disclosed and still obtain a like or similar result without departing from the spirit and scope of the invention, therefore all matter set forth herein is to be interpreted as illustrative and not in a limiting sense.

What is claimed is:

1. A method for focusing light within a scattering medium comprising:
   illuminating the scattering medium with a sample beam from a coherent light source, wherein the scattering medium comprises an ultrasound focus containing a focused ultrasound wave at a first position;
   obtaining a first signal beam emerging from the scattering medium comprising a first ultrasound-modulated wavefront, wherein the first ultrasound-modulated wavefront comprises a portion of the sample beam which has passed through the ultrasound focus at the first position;

recording the first ultrasound-modulated wavefront from the first signal beam;

advancing the ultrasound focus to a second position within the scattering medium;

illuminating the scattering medium with a first phase-conjugated wavefront corresponding to the first ultrasound-modulated wavefront;

obtaining a second signal beam emerging from the scattering medium comprising a second ultrasound-modulated wavefront, wherein the second ultrasound-modulated wavefront comprises a portion of the first phase-conjugated wavefront which has passed through the ultrasound focus at the second position; and recording the second ultrasound-modulated wavefront from the second signal beam.

2. The method of claim 1, further comprising iteratively illuminating a plurality of additional positions in the scattering medium by:

advancing the ultrasound focus to each of a plurality of additional positions within the scattering medium;

illuminating the scattering medium with each of a plurality of additional phase-conjugated wavefronts, wherein:
the first additional phase-conjugated wavefront corresponds to the second ultrasound-modulated wavefront; and
each subsequent phase-conjugated wavefront of the plurality of phase-conjugated wavefronts corresponds to an additional ultrasound-modulated wavefront obtained with the ultrasound focus situated at a previous position;

obtaining each of a plurality of additional signal beams emerging from the scattering medium, wherein each additional signal beam comprises a portion of an additional phase-conjugated wavefront which has passed through the ultrasound focus at each additional position; and recording each of the plurality of additional ultrasound-modulated wavefronts corresponding to one of the plurality of additional phase-conjugated wavefronts.

3. The method of claim 1, wherein the total energy of each phase-conjugated wavefront is greater than or equal to the total energy of its corresponding ultrasound-modulated wavefront.

4. The method of claim 1, wherein each ultrasound-modulated wavefront is recorded on a phase-conjugating device.

5. The method of claim 1, wherein the focused ultrasound wave is produced using at least one ultrasound transducer.

6. The method of claim 5, wherein the focused ultrasound wave is produced using an array of at least two ultrasound transducers.

7. The method of claim 1, wherein each phase-conjugated wavefront is produced by reading a holographically recorded interference pattern using a phase-conjugate of the reference beam, or by illuminating a spatial light modulator displaying a wavefront of the ultrasound-modulated light with the phase-conjugate of the reference beam.

8. The method of claim 1, wherein any two adjacent positions of the ultrasound focus are separated by a step size of no more than about one transport mean free path.

9. The method of claim 1, wherein a time to move between any two adjacent positions is no more than a speckle decorrelation time.

10. An apparatus for focusing light within a scattering medium comprising:

a coherent light source to emit a sample beam into the scattering medium;

a movable ultrasound transducer to produce a focused ultrasound wave at one of at least two positions;

a phase-conjugating device holographically recording an ultrasound-modulated wavefront as an interference pattern between an ultrasound-encoded portion of the sample beam and a reference beam, and holographically reading the ultrasound-modulated wavefront using a reconstruction beam to produce a phase-conjugated wavefront and delivering the phase-conjugated wavefront to the scattering medium;

an optical assembly to direct the sample beam into the scattering medium at a first position and to direct the phase-conjugated wavefront to the scattering medium at a second position; and a controller to operate the coherent light source, the movable ultrasound transducer, the optical assembly, and the phase-conjugating device in a coordinated fashion.

11. The apparatus of claim 10, wherein an energy of the phase-conjugated wavefront is greater than or equal to a total energy of the corresponding ultrasound-modulated wavefront.

12. The apparatus of claim 10, further comprising a detector.

13. The apparatus of claim 10, further comprising at least one acousto-optic modulator to frequency shift the sample beam by an amount equal to a central frequency of the ultrasound wave.

14. The apparatus of claim 10, wherein the phase-conjugating device is a photorefractive material or a digital holography device and a spatial light modulator.

15. The apparatus of claim 10, wherein the phase-conjugating device records an interference pattern between the signal beam emitted by the scattering medium and a reference beam and stores the interference pattern as a hologram.

16. The apparatus of claim 15, wherein the phase-conjugating device reads the hologram using a reconstruction beam that is a phase-conjugate of the reference beam.

17. A system for focusing light within a scattering medium comprising:

a moveable ultrasound transducer operatively connected to the scattering medium to produce at least one focused ultrasound wave within each of a sequence of focus regions situated within the scattering medium;

a coherent light source;

an optical assembly operatively connected to the coherent light source, the scattering medium, and a phase-conjugating device, wherein the optical assembly receives one or more coherent light beams from the coherent light source, delivers a sample beam into the scattering medium, and delivers a reference beam and a reconstruction beam to the phase-conjugating device;

the phase-conjugating device operatively connected to the scattering medium, wherein the phase-conjugating device:

receives an ultrasound-encoded portion of the sample beam from the scattering medium;

holographically records the ultrasound-modulated wavefront as an interference pattern between the ultrasound-encoded portion of the sample beam and the reference beam;

holographically reads the ultrasound-modulated wavefront using the reconstruction beam to produce a phase-conjugated beam; and delivers the phase-conjugated beam to the scattering medium; and a controller operatively connected to the coherent light source, the optical assembly, the phase-conjugating device, and the ultrasound transducer, wherein the controller controls at least one of:

the movement of the ultrasound transducer between each of the sequence of focal regions;

the production of each of the at least one focused ultrasound waves by the ultrasound transducer;

the delivery of the sample beam, the reference beam, and the reconstruction beam by the optical assembly; and the production of the one or more coherent light beams by the coherent light source.

18. The system of claim 17, further comprising an acousto-optic modulation device operatively connected to the optical assembly, wherein the acousto-optic modulation device modifies the frequency of either A) the sample beam or B) the reference beam and the reconstruction beam.

19. The system of claim 17, further comprising a detector operatively connected to the scattering medium, wherein the detector detects a signal emitted from the scattering medium in response to illumination by the phase-conjugated beam.

* * * * *